US011818333B2

(12) United States Patent
Sasaki et al.

(10) Patent No.: US 11,818,333 B2
(45) Date of Patent: Nov. 14, 2023

(54) IMAGING DEVICE, IMAGING SYSTEM, AND FAILURE DETECTION METHOD

(71) Applicant: Sony Semiconductor Solutions Corporation, Kanagawa (JP)

(72) Inventors: Keita Sasaki, Kanagawa (JP); Naoki Kawazu, Kanagawa (JP); Masaki Murozuka, Kanagawa (JP); Yuichi Motohashi, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 191 days.

(21) Appl. No.: 17/417,216

(22) PCT Filed: Dec. 19, 2019

(86) PCT No.: PCT/JP2019/049817
§ 371 (c)(1),
(2) Date: Jun. 22, 2021

(87) PCT Pub. No.: WO2020/149094
PCT Pub. Date: Jul. 23, 2020

(65) Prior Publication Data
US 2022/0060682 A1     Feb. 24, 2022

(30) Foreign Application Priority Data

Jan. 17, 2019   (JP) .................................. 2019-006177

(51) Int. Cl.
*H04N 17/00*   (2006.01)
*H04N 7/18*    (2006.01)
(Continued)

(52) U.S. Cl.
CPC ........... *H04N 17/002* (2013.01); *H04N 7/183* (2013.01); *H04N 25/702* (2023.01); *H04N 25/745* (2023.01); *H04N 25/75* (2023.01)

(58) Field of Classification Search
CPC .... H04N 17/002; H04N 7/183; H04N 25/702; H04N 25/745; H04N 25/75; H04N 25/76
See application file for complete search history.

(56) References Cited

U.S. PATENT DOCUMENTS 7,129,978 B1\* 10/2006 Brehmer .............. H04N 25/445
                                                      348/308
2019/0082134 A1\* 3/2019 Ushinaga ............. H04N 25/745
(Continued)

FOREIGN PATENT DOCUMENTS

CN     102760493 A    10/2012
CN     105245869 A     1/2016
(Continued)

OTHER PUBLICATIONS

International Search Report (PCT/ISA/210), international Application No. PCT/JP2019/049817, dated Feb. 27, 2020.
(Continued)

*Primary Examiner* — Michael E Teitelbaum
(74) *Attorney, Agent, or Firm* — Michael Best & Friedrich LLP

(57) ABSTRACT

An imaging device according to an embodiment of the present disclosure includes a pixel array including a plurality of pixels, a scanning control section that controls scanning of the plurality of pixels, and a readout control section that controls reading of the plurality of pixels. The imaging device further includes a first waveform generation part that generates a plurality of control signals for controlling of at least one of the scanning control section or the readout control section, a second waveform generation part that generates a plurality of reference signals, and a failure detection section that detects a failure of the first waveform generation part or the second waveform generation part on
(Continued)

a basis of comparison between the plurality of control signals and the plurality of reference signals.

13 Claims, 20 Drawing Sheets

(51) Int. Cl.
*H04N 25/75* (2023.01)
*H04N 25/702* (2023.01)
*H04N 25/71* (2023.01)

(56) References Cited

U.S. PATENT DOCUMENTS

2019/0113584 A1\* 4/2019 Cook .................. G01R 33/0035
2019/0297287 A1   9/2019 Oka et al.

FOREIGN PATENT DOCUMENTS

| CN | 106134183 A | 11/2016 |
| CN | 107888851 A | 4/2018 |
| CN | 108028898 A | 5/2018 |
| CN | 109155829 A | 1/2019 |
| JP | 2018-93326 A | 6/2018 |
| WO | 2017/209221 A1 | 12/2017 |
| WO | 2018/150778 A1 | 8/2018 |

OTHER PUBLICATIONS

Notification of Transmittal of the International Search Report and the Written Opinion of the international Searching Authority, or the Declaration (PCT/ISA/220), International Application No. PCT/JP2019/049817, dated Mar. 10, 2020.

Written Opinion of the International Search Authority (PCT/ISA/237), International Application No. PCT/JP2019/049817, dated Mar. 10, 2020.

\* cited by examiner

[ FIG. 1 ]
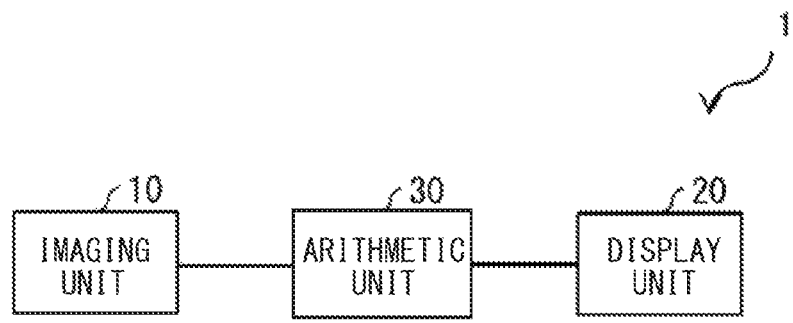
[ FIG. 2 ]
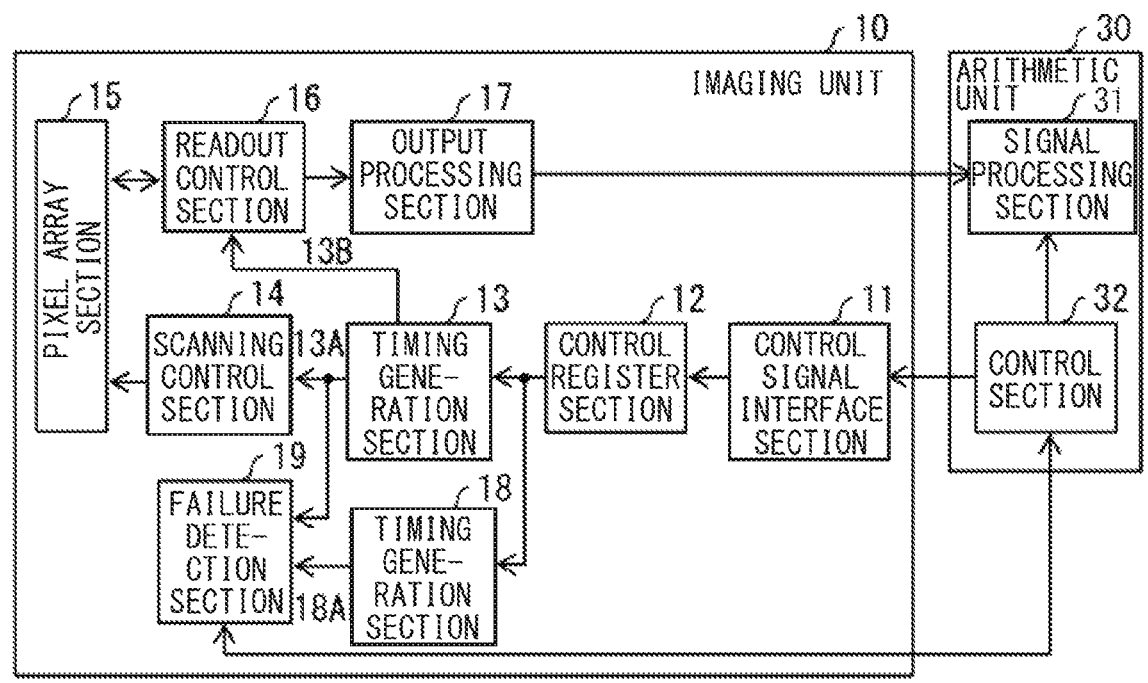

[FIG. 3]
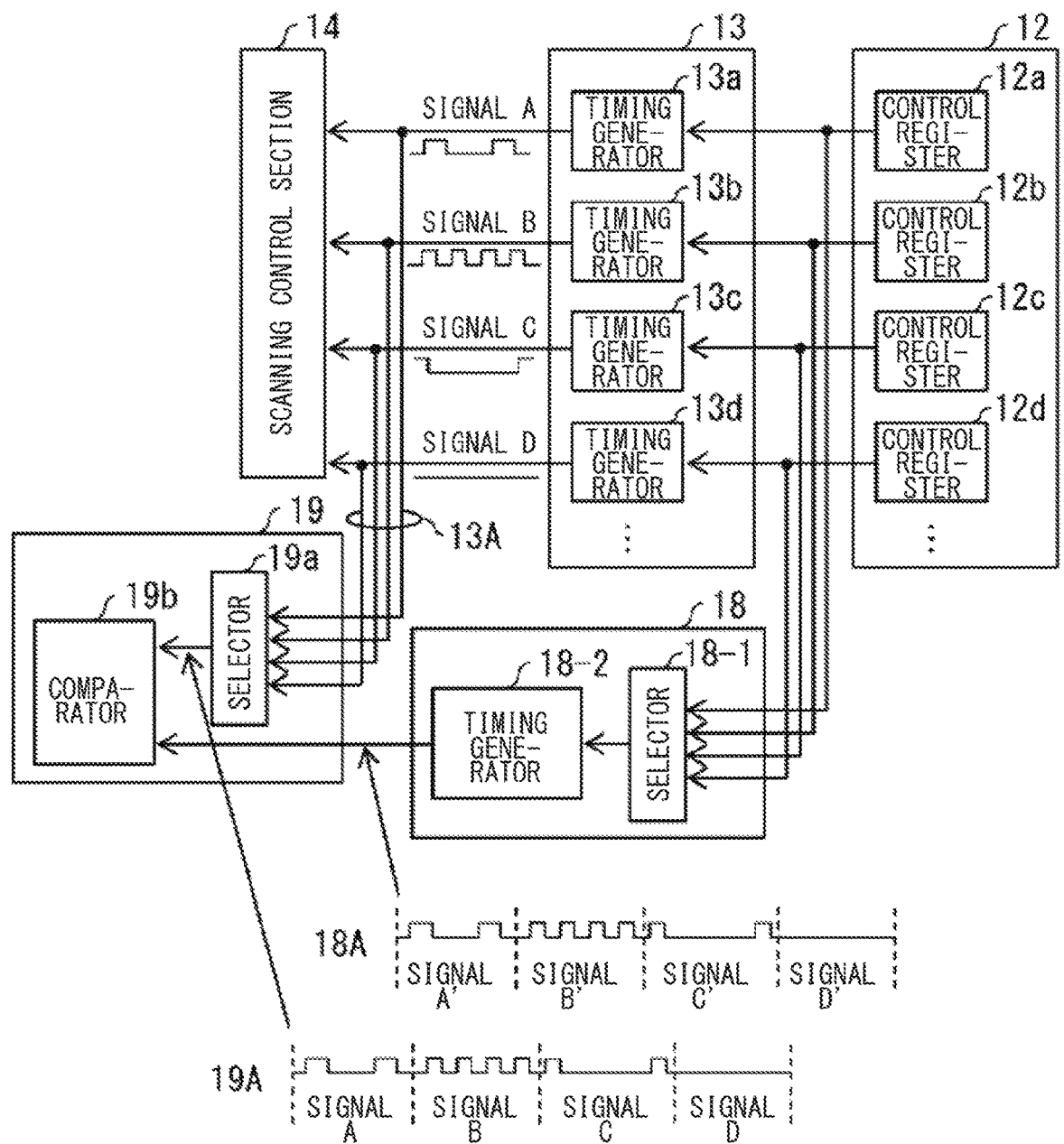

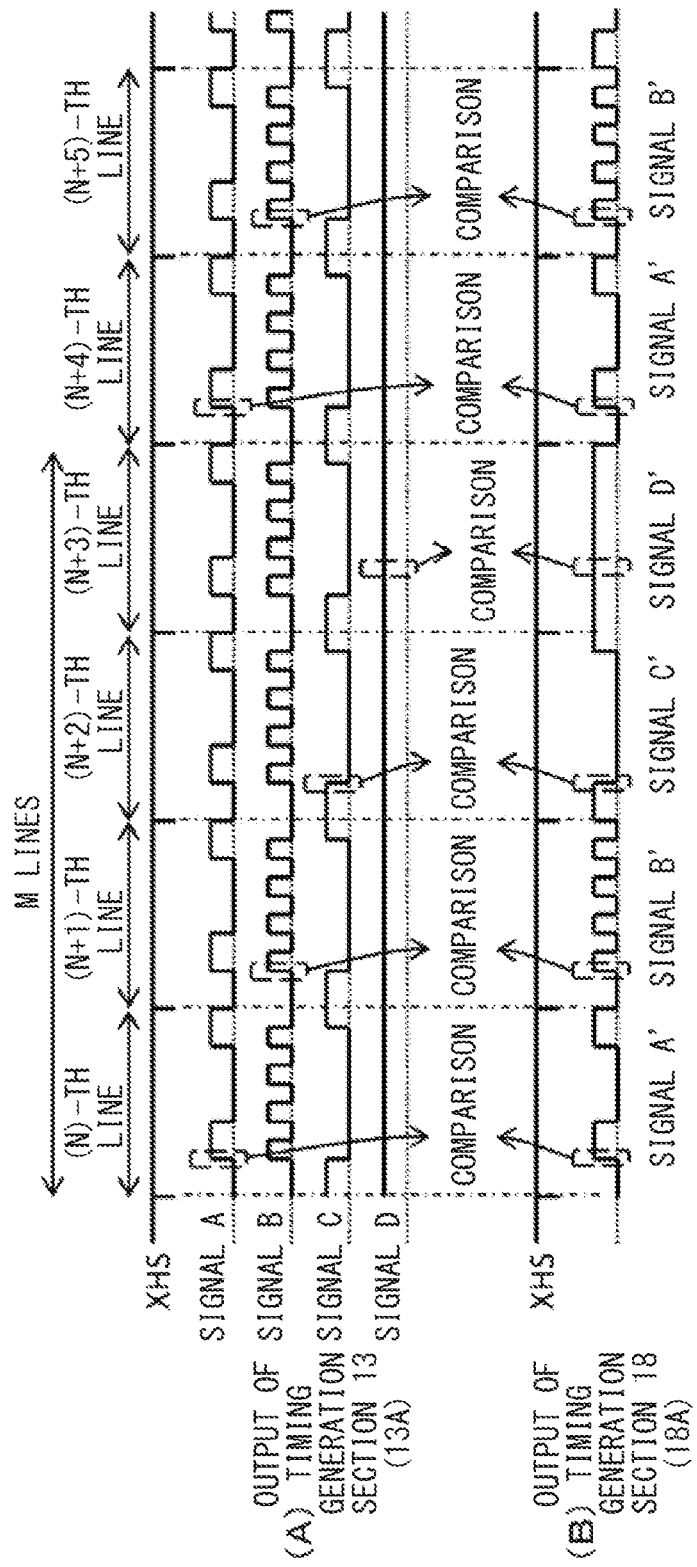
[FIG.4]

[ FIG. 5 ]
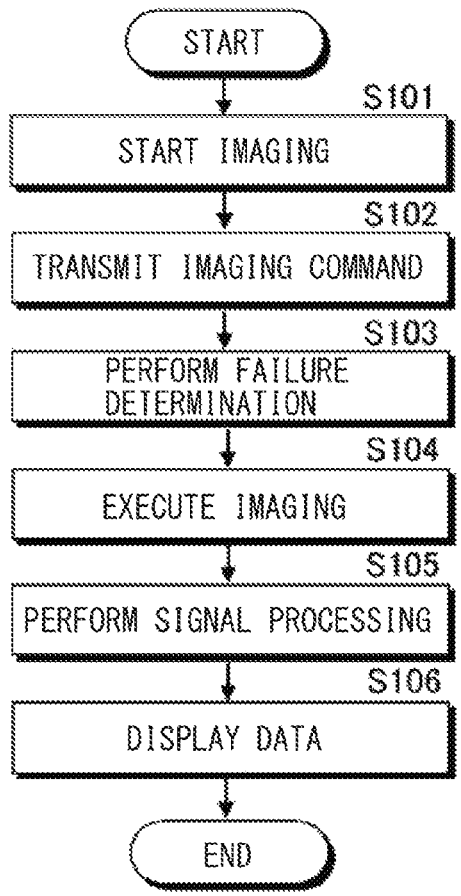
[ FIG. 6 ]
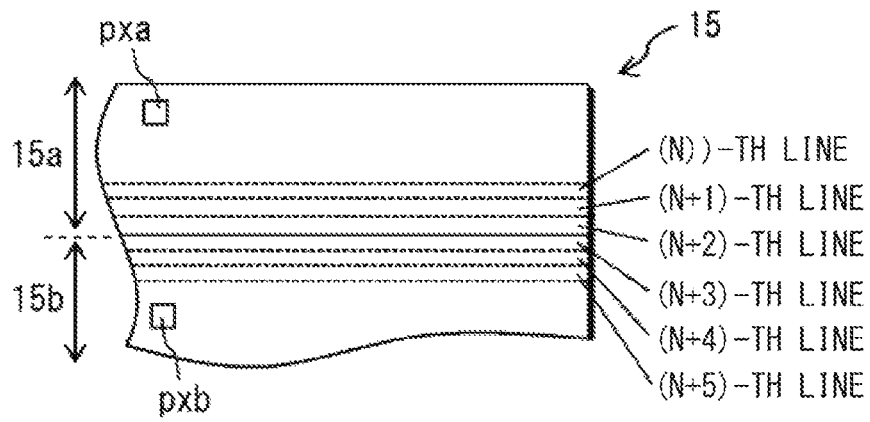

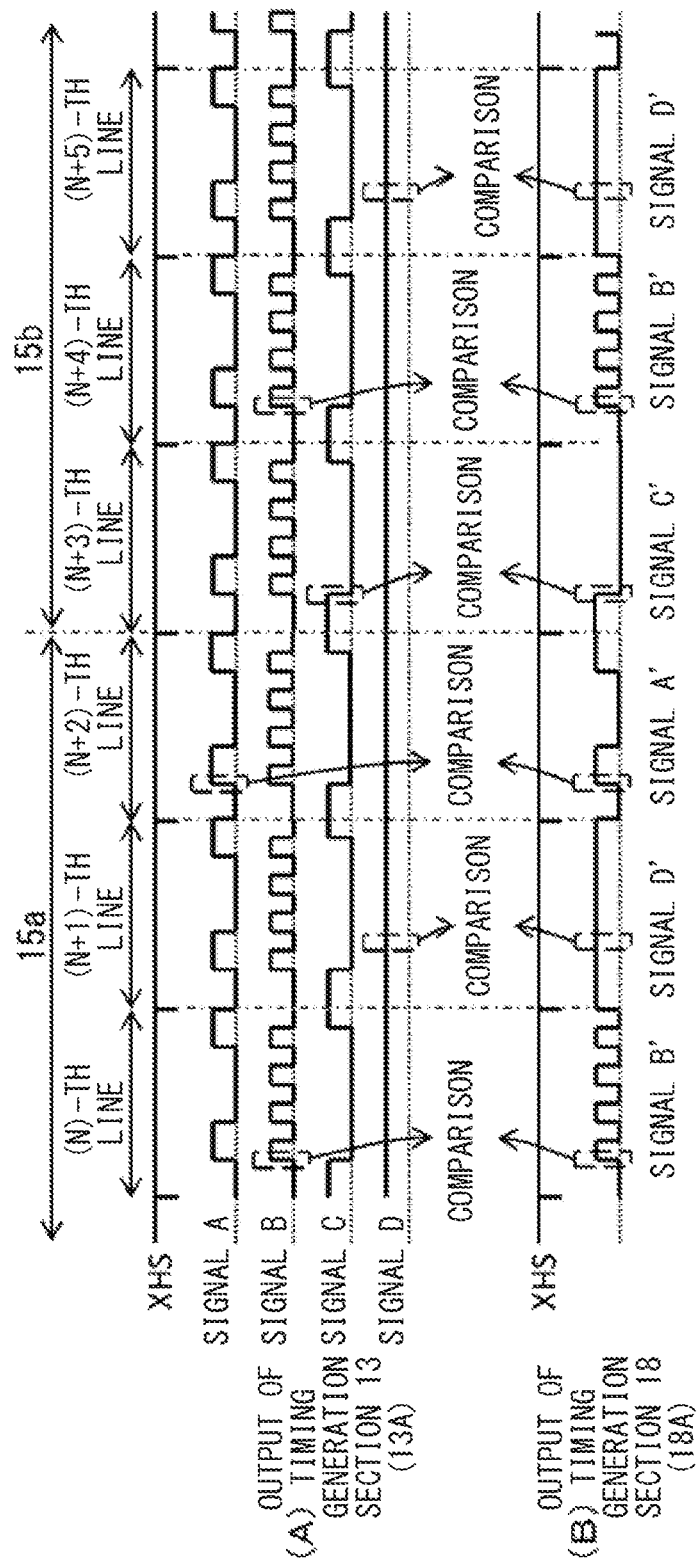

[ FIG. 8 ]
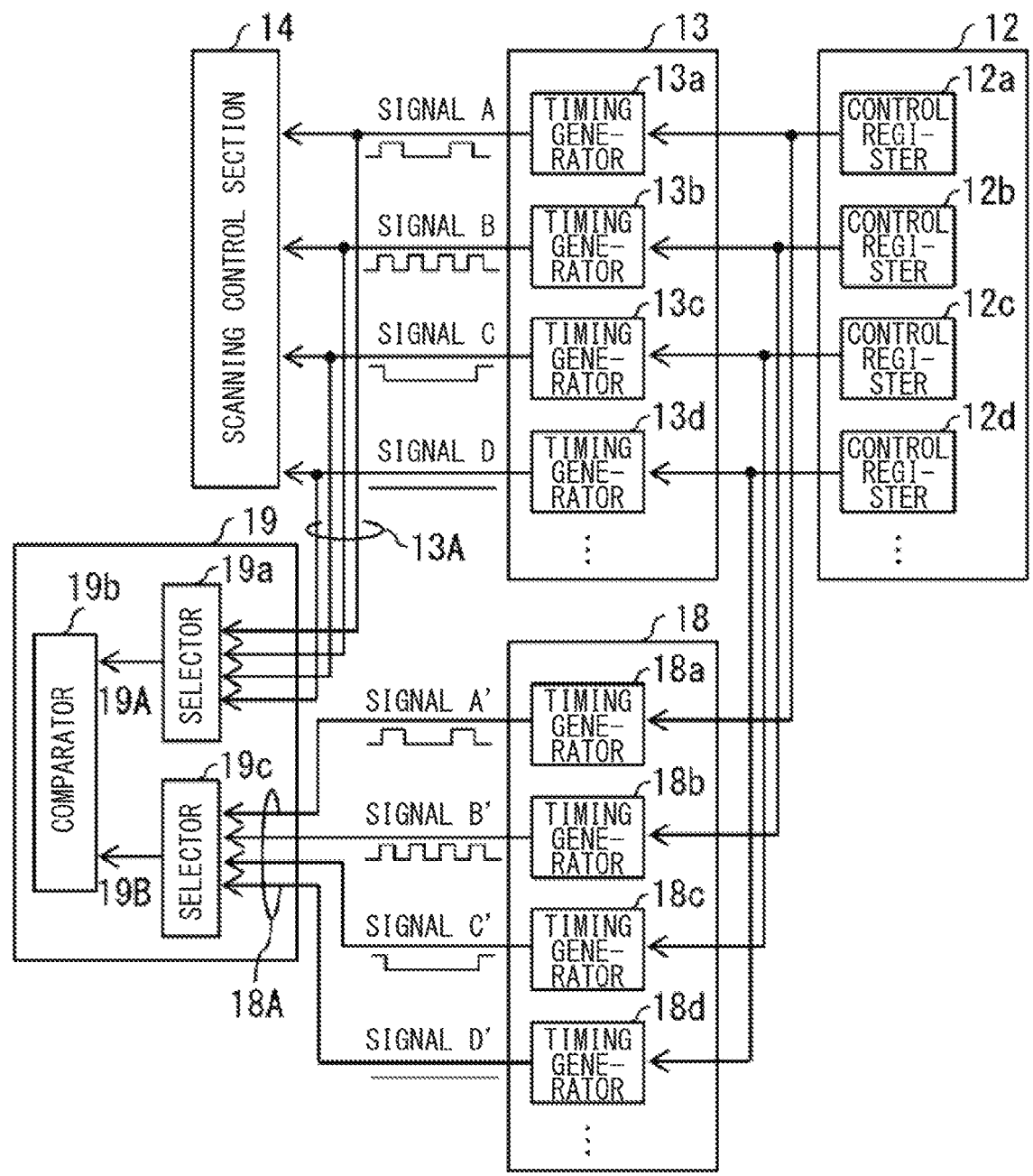

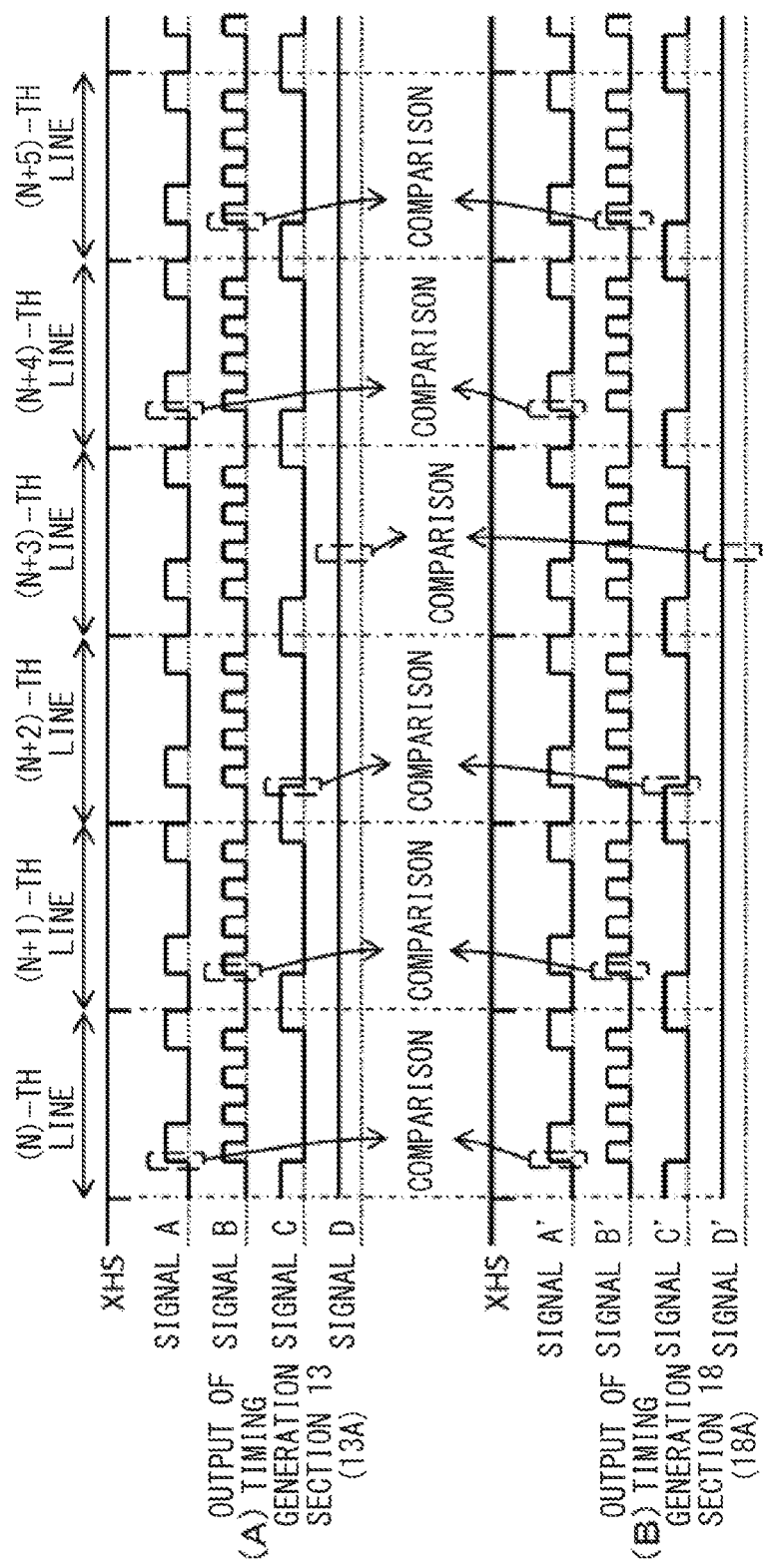
[FIG.9]

[ FIG. 10 ]
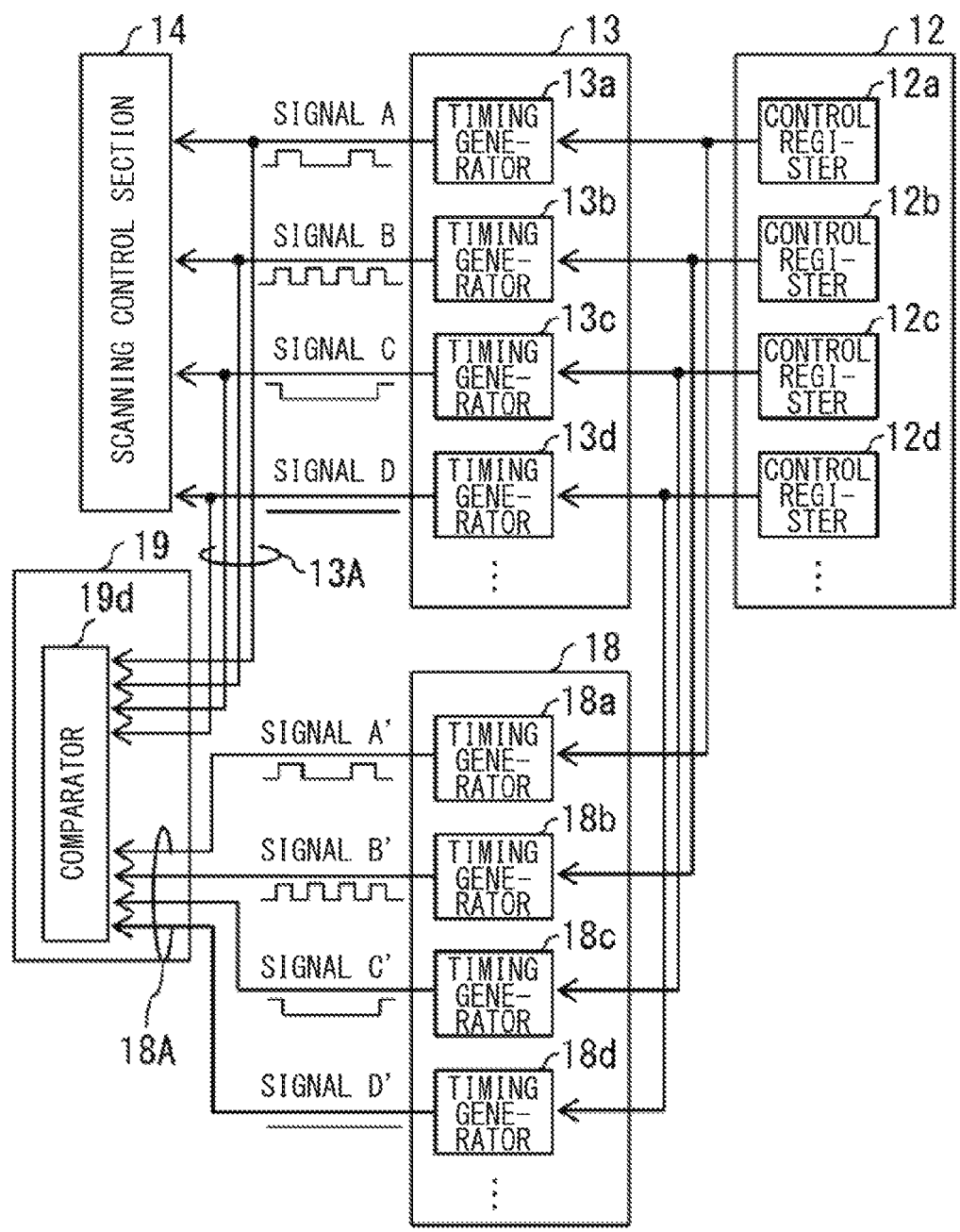

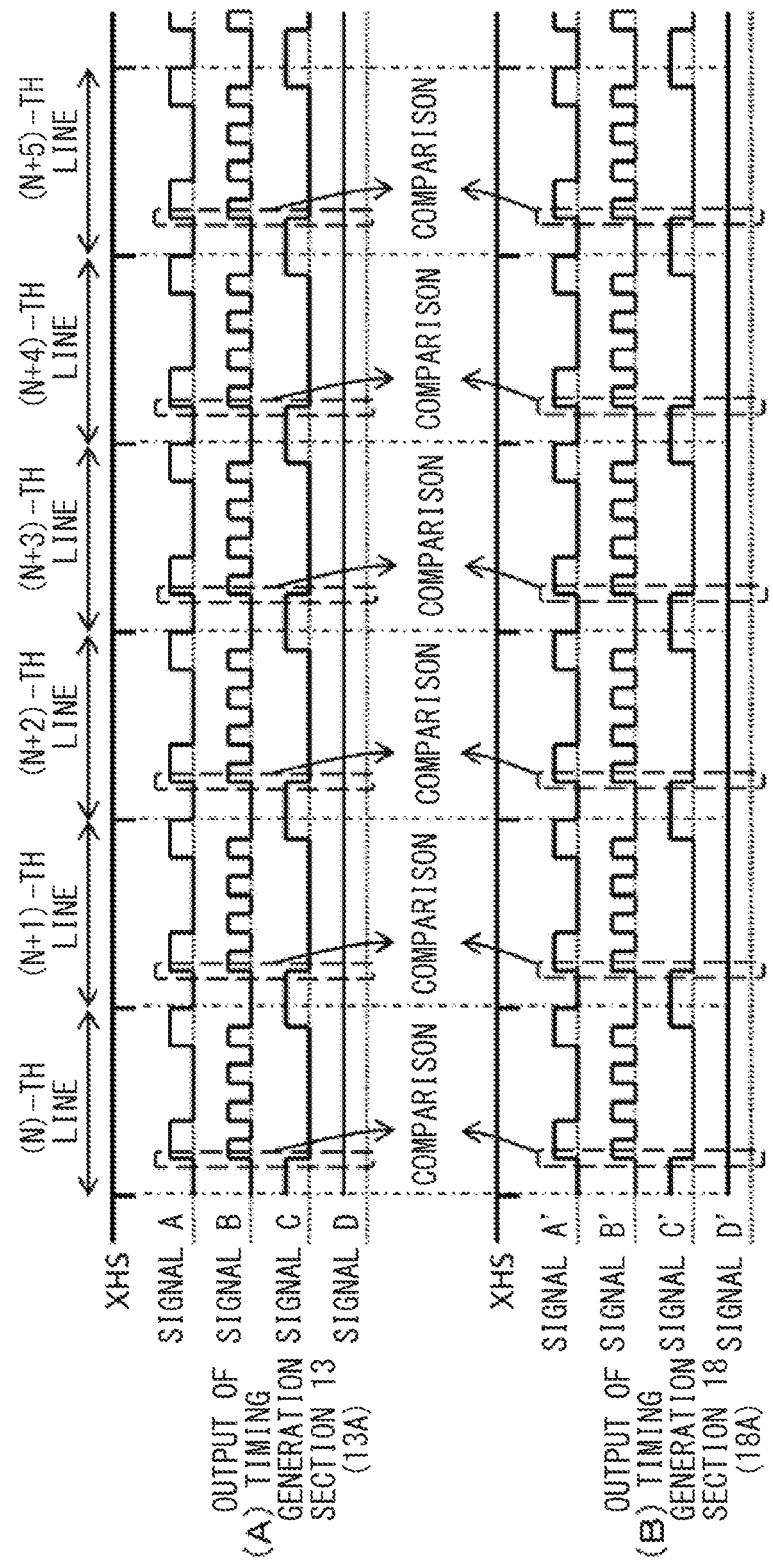
[FIG.11]

[ FIG. 12 ]
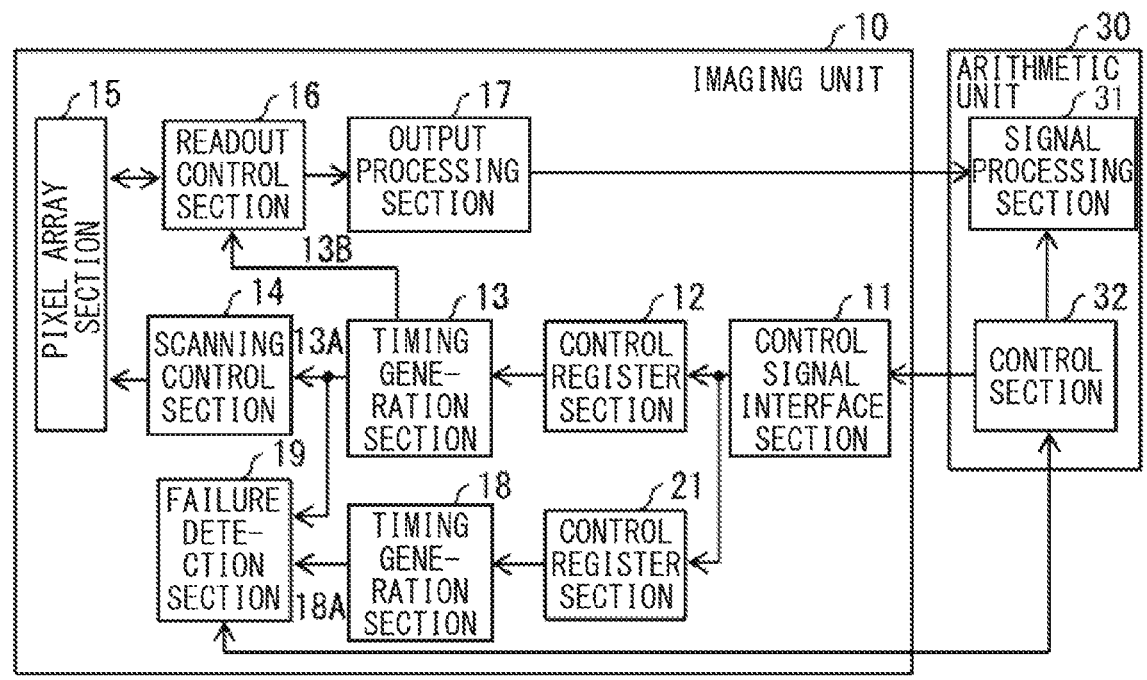
[ FIG. 13 ]
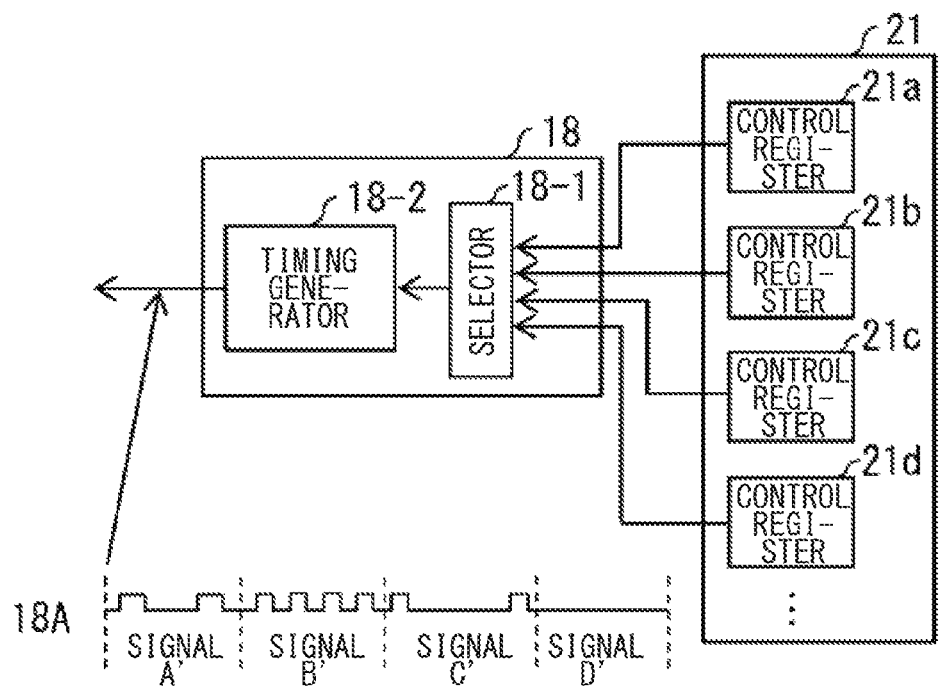

[ FIG. 14 ]
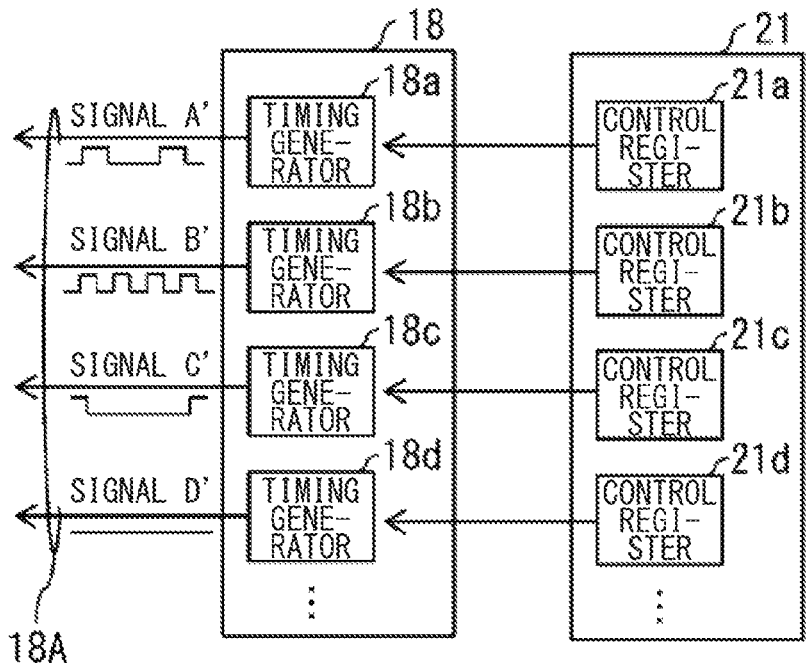
[ FIG. 15 ]
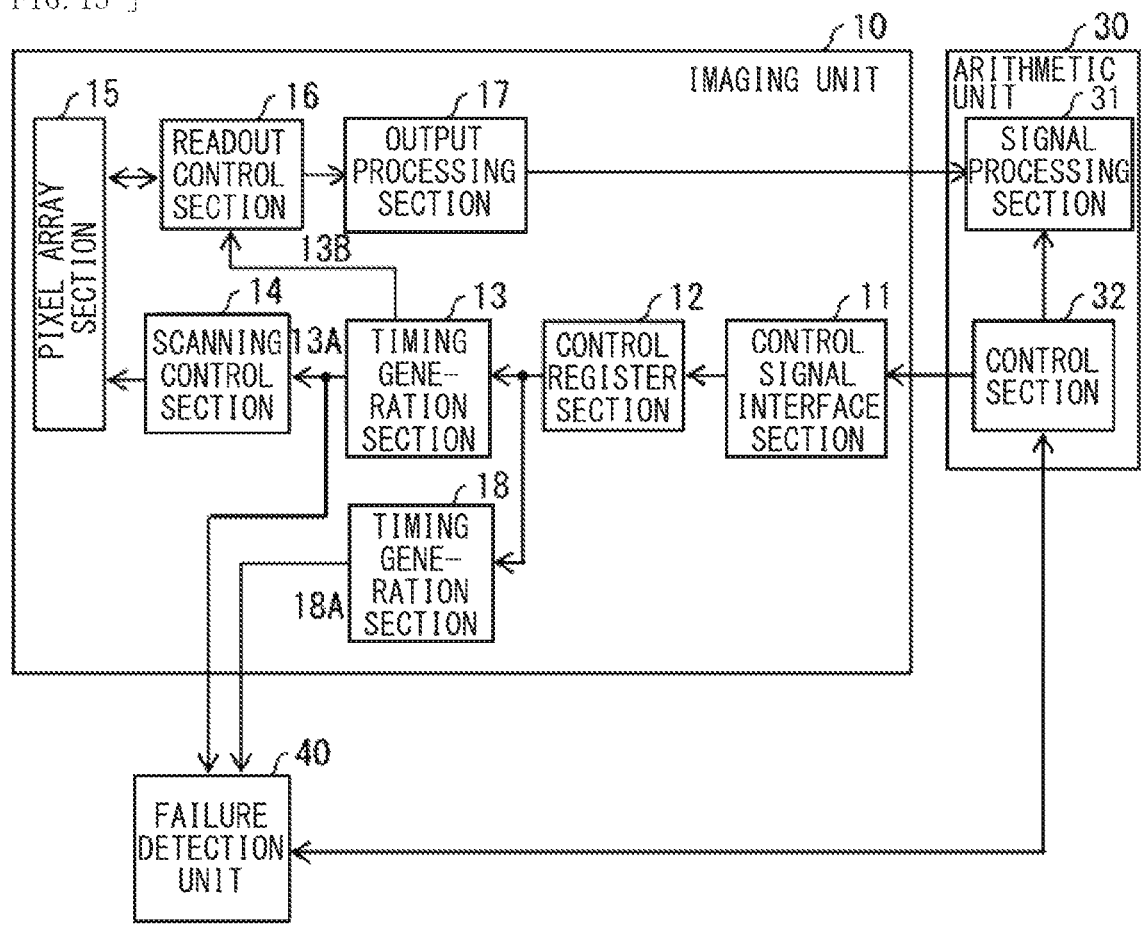

[FIG. 16]
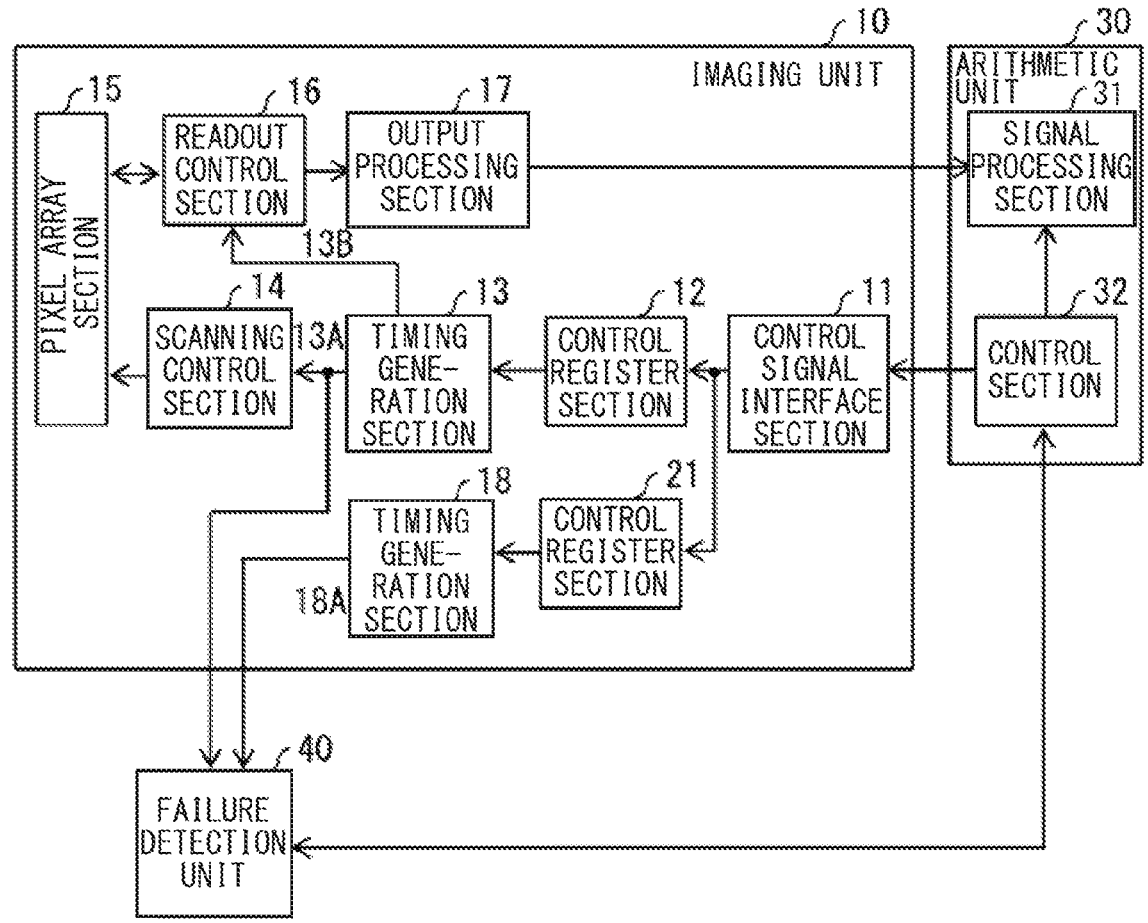
[FIG. 17]
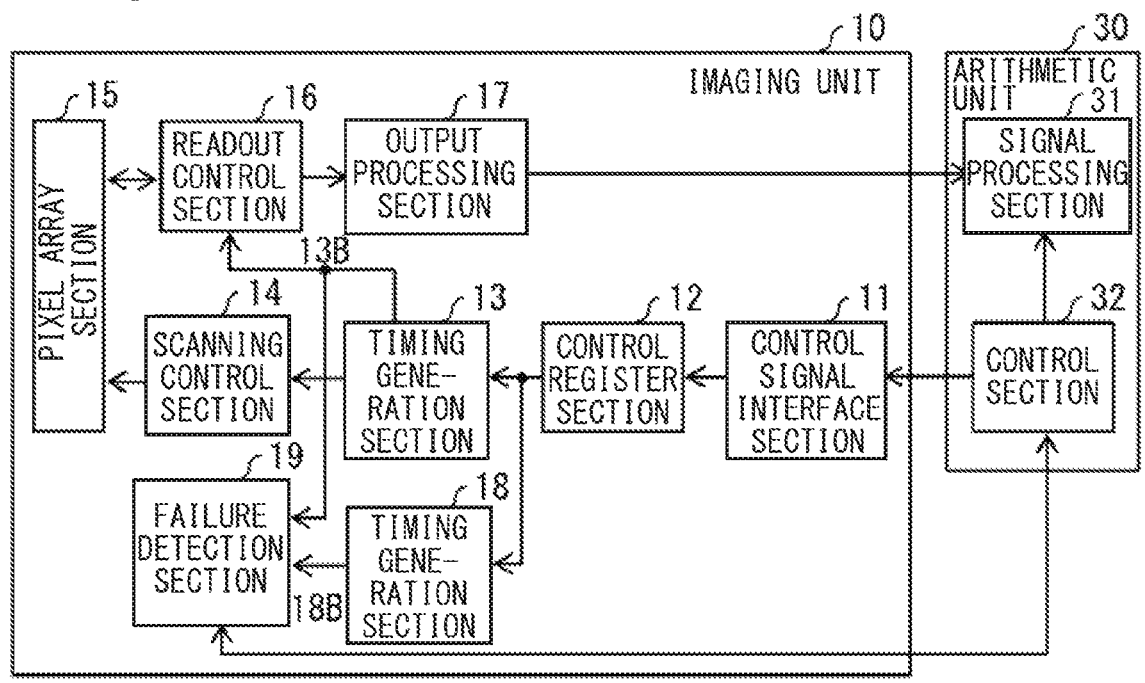

[FIG. 18]
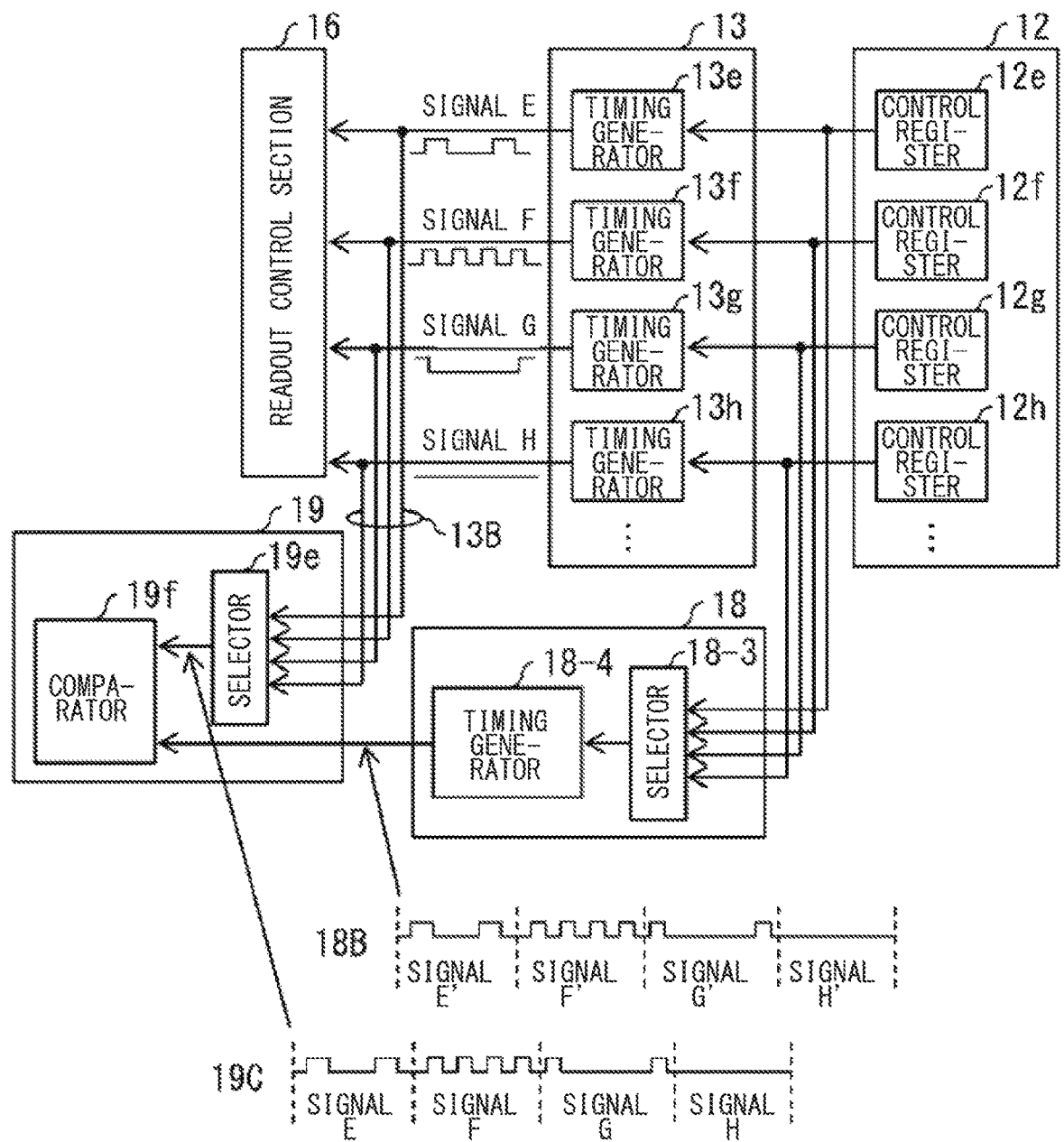

[FIG. 19]
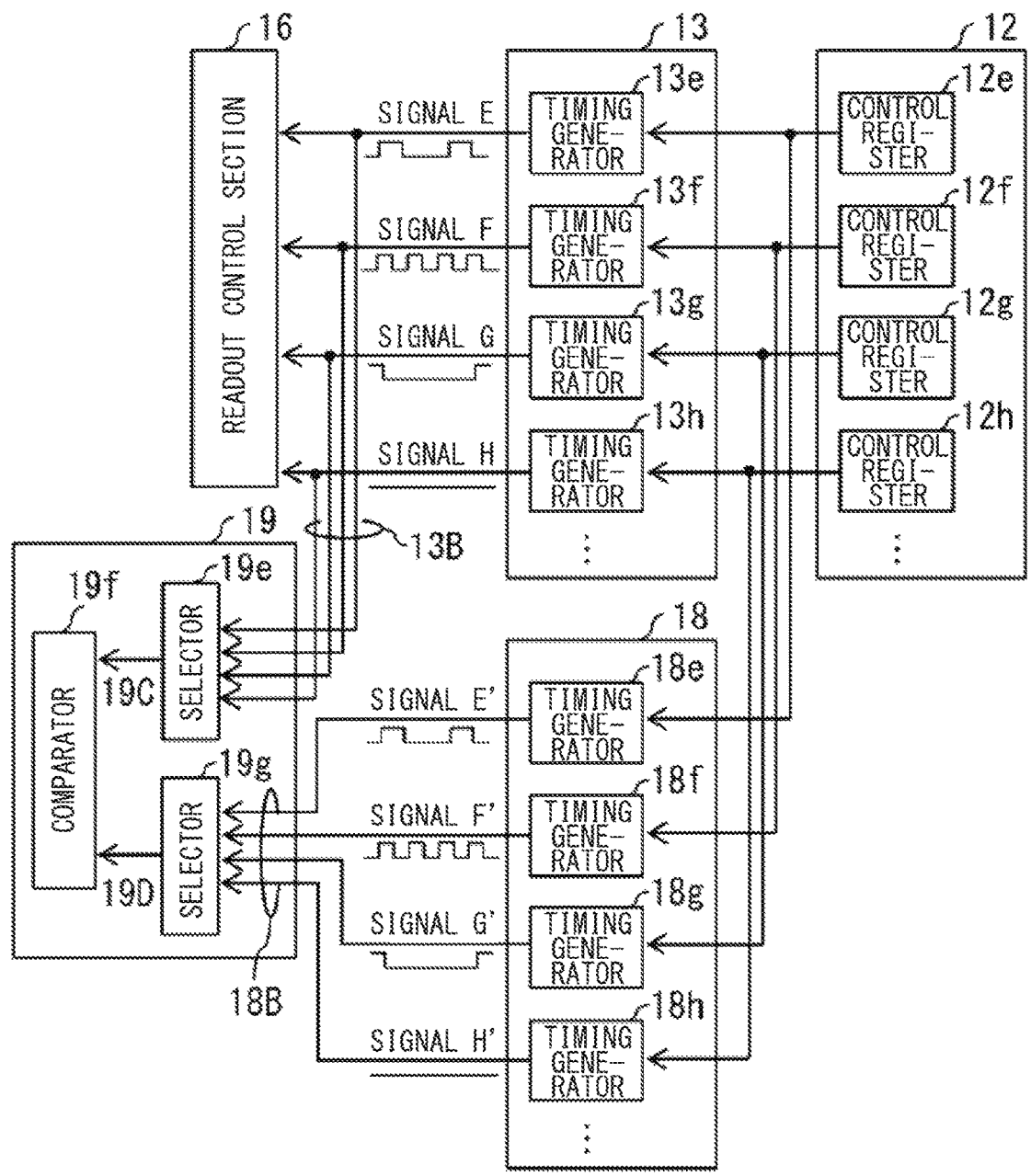

[ FIG. 20 ]
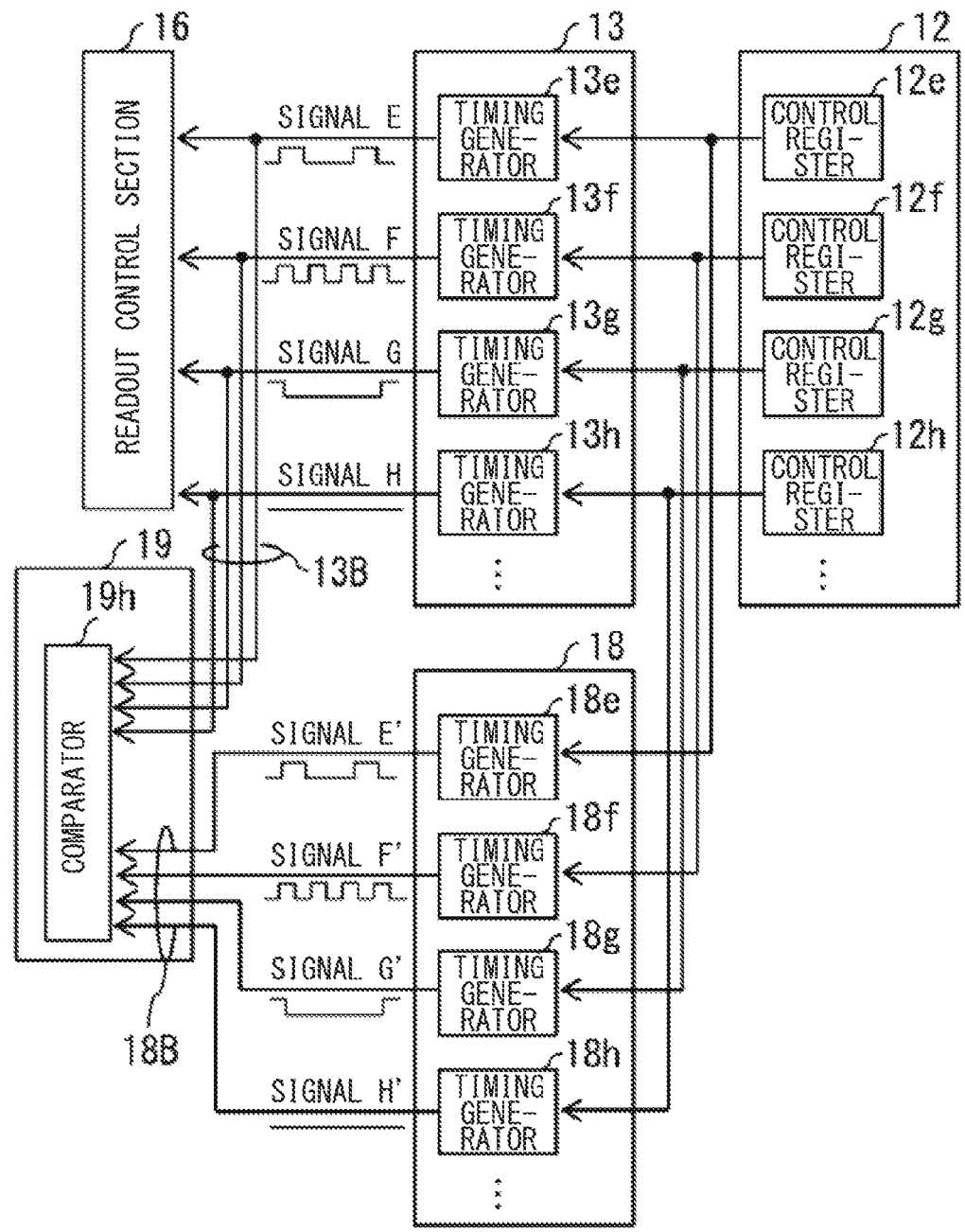

[ FIG. 21 ]
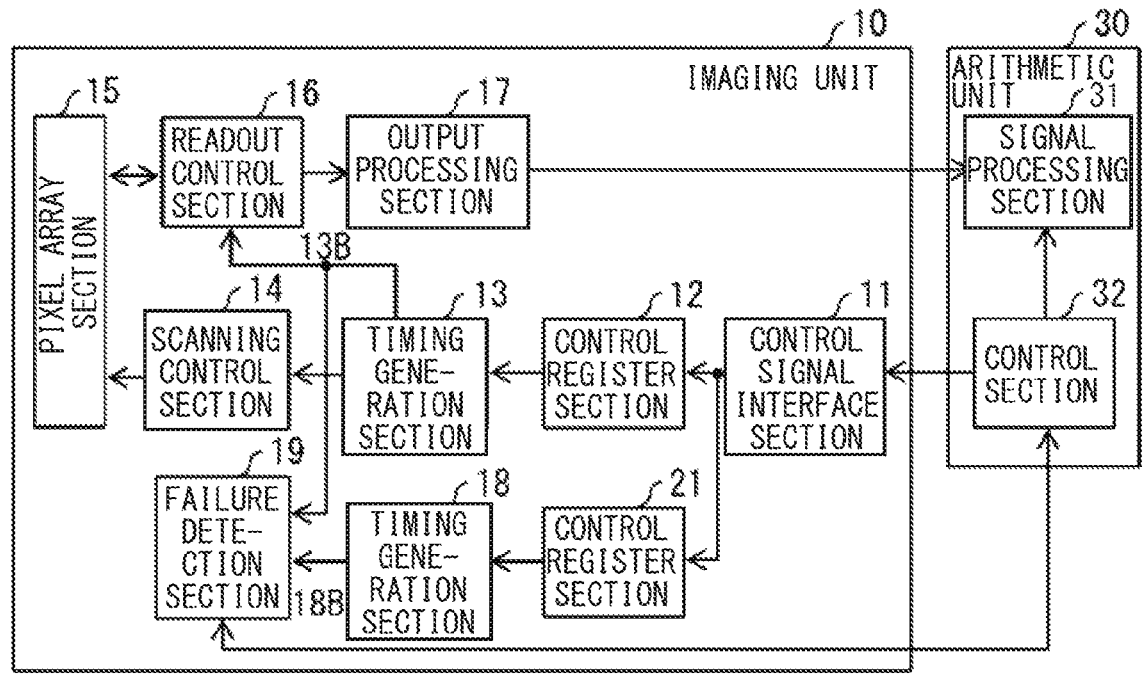
[ FIG. 22 ]
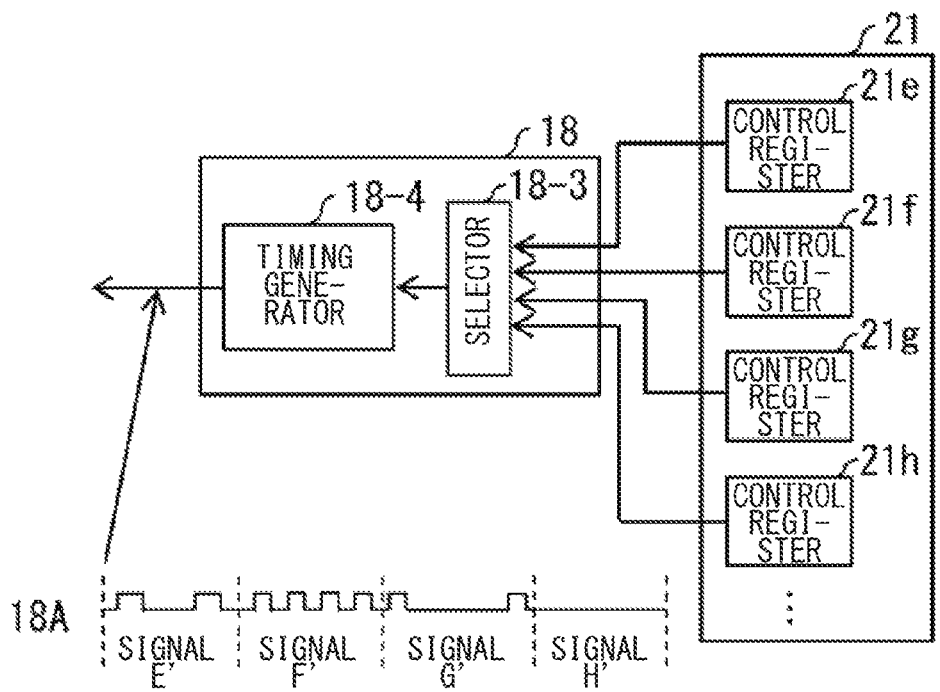

[ FIG. 23 ]
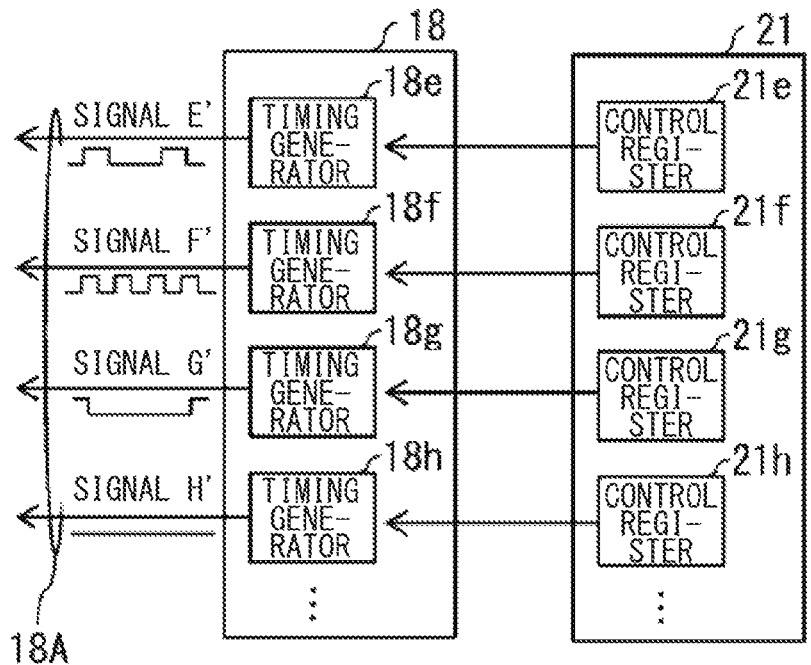
[ FIG. 24 ]
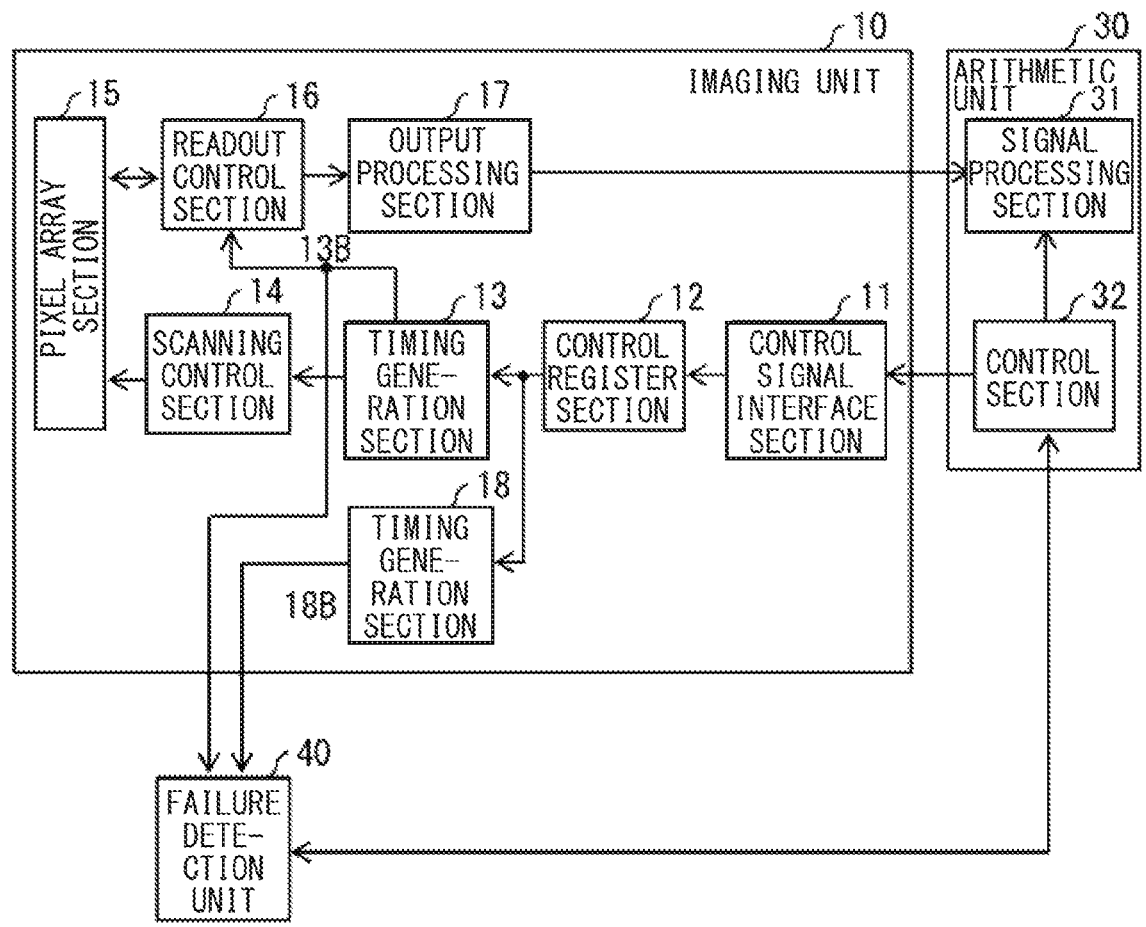

[FIG. 25]
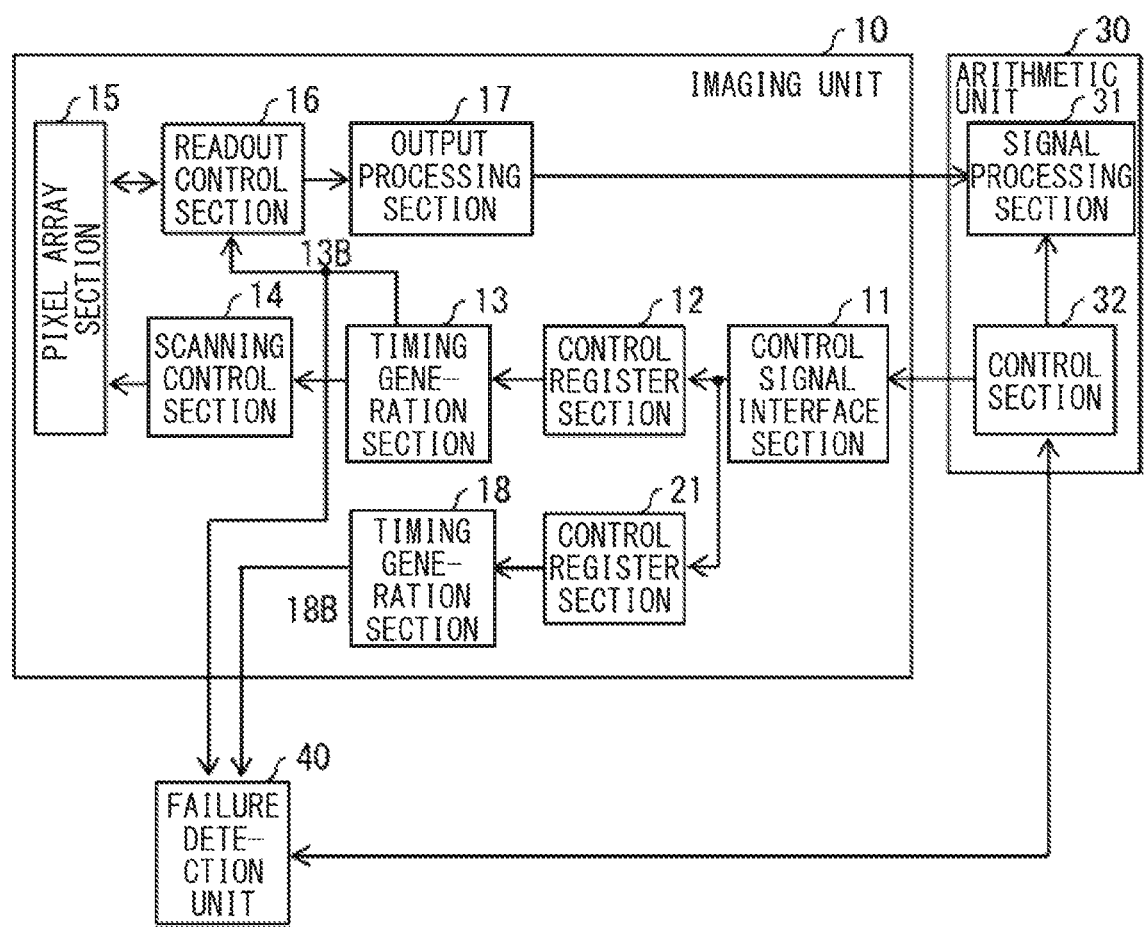

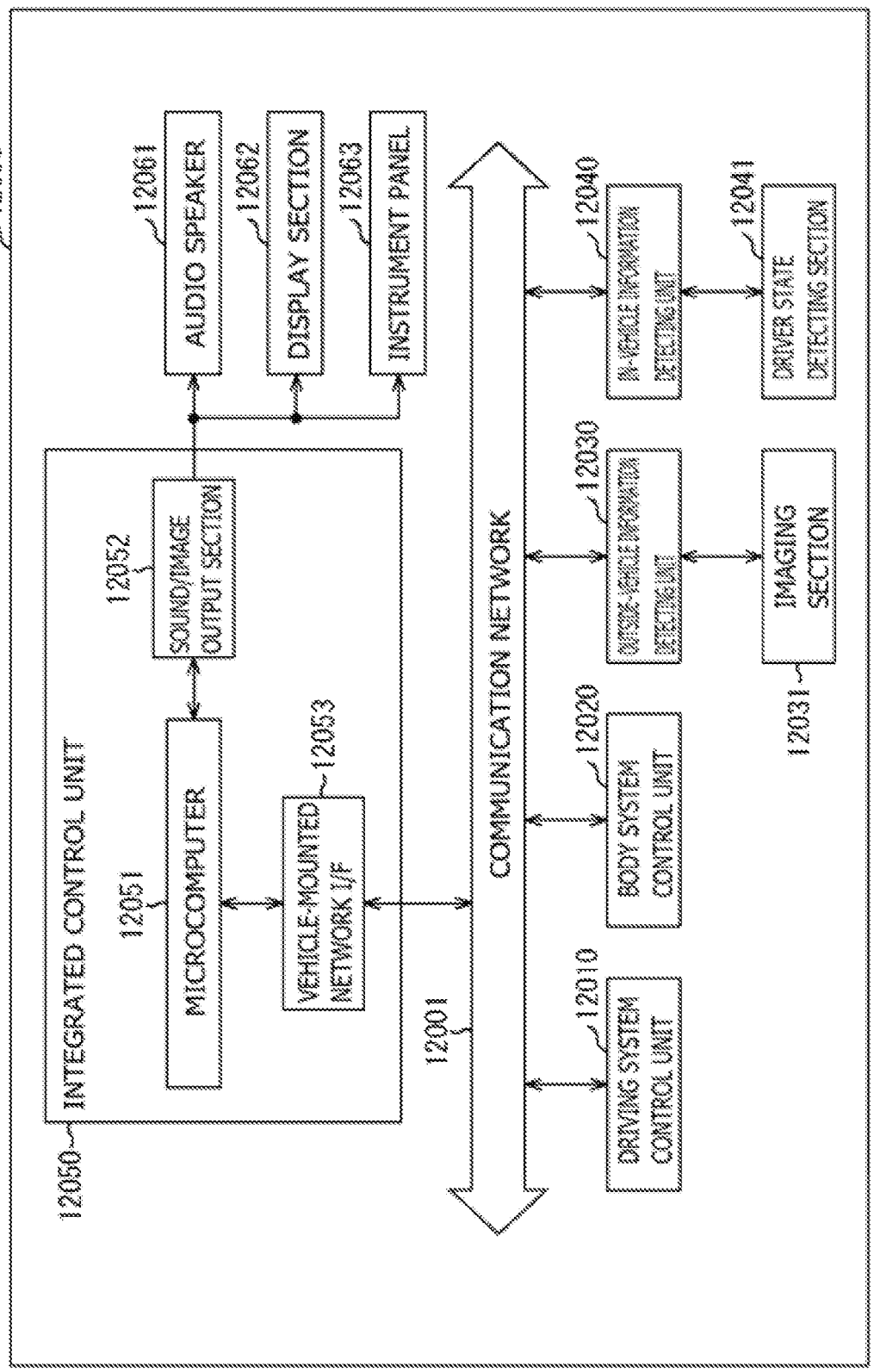
[FIG.26]

[FIG. 27]
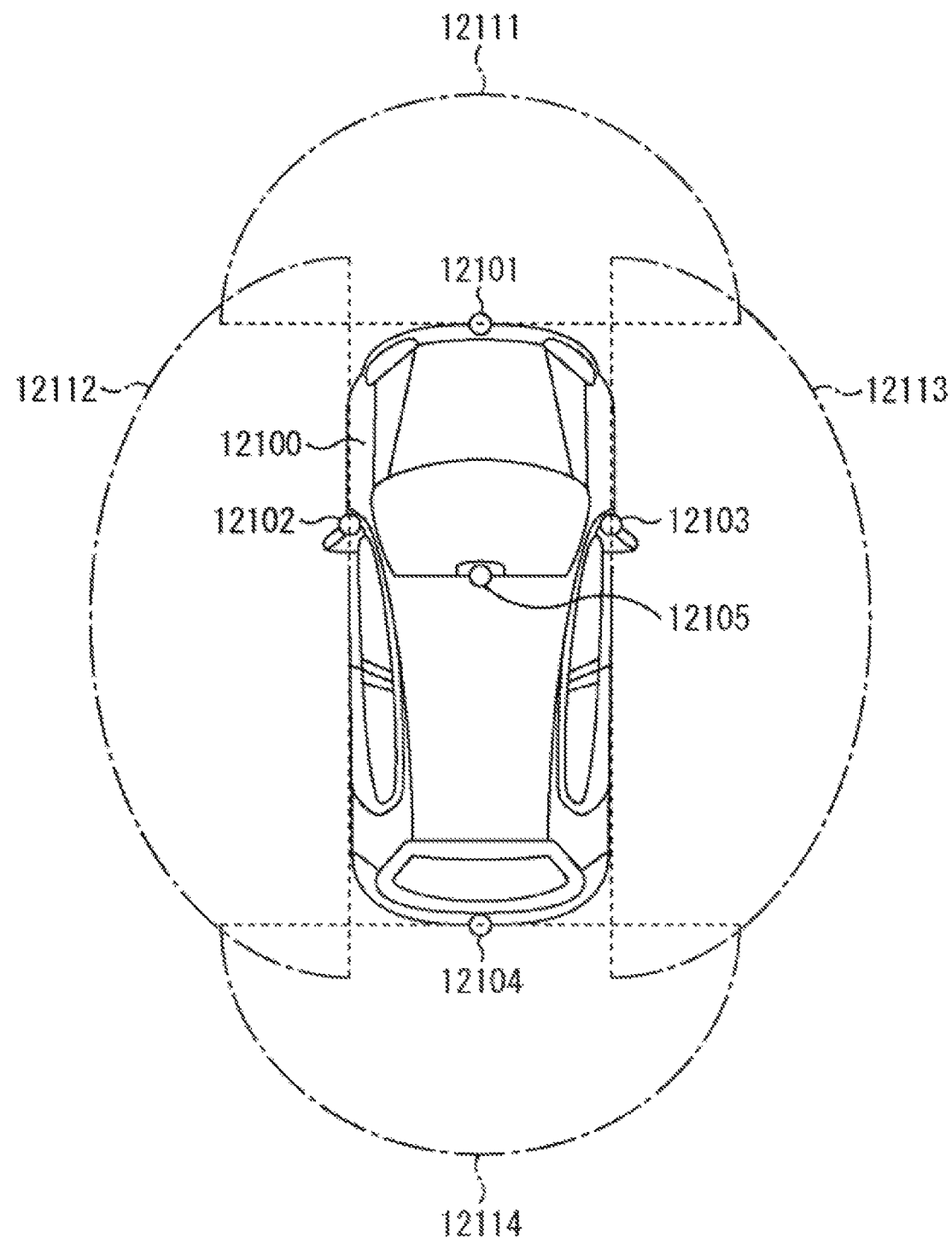

IMAGING DEVICE, IMAGING SYSTEM, AND FAILURE DETECTION METHOD

TECHNICAL FIELD

The present disclosure relates to an imaging device, an imaging system, and a failure detection method.

BACKGROUND ART

In a case where an image sensor is used for a use application where a failure is not acceptable, it is required to automatically detect a failure of the image sensor. The image sensor includes, for example, a sensor unit that obtains a captured image, a control circuit that controls the sensor unit, a signal processing circuit that processes the captured image obtained by the sensor unit, and the like. In this case, for example, it is conceivable to detect a failure of the control circuit or the signal processing circuit. It is to be noted that failure detection of an ADC (Analog Digital Converter) included in the signal processing circuit is described, for example, in PTL 1 listed below.

CITATION LIST

Patent Literature

PTL 1: International Publication No. WO2018/150778

SUMMARY OF THE INVENTION

Incidentally, unlike the signal processing circuit, the control circuit mounted in the image sensor is less likely to generate an expected value that is uniquely determined. For this reason, there has been an issue in which the failure detection in the control circuit is not easy. It is therefore desirable to provide an imaging device, an imaging system and a failure detection method that make it possible to detect a failure of a control circuit.

An imaging device according to an embodiment of the present disclosure includes a pixel array including a plurality of pixels, a scanning control section that controls scanning of the plurality of pixels, and a readout control section that controls reading of the plurality of pixels. The imaging device further includes a first waveform generation part that generates a plurality of control signals for controlling of at least one of the scanning control section or the readout control section, a second waveform generation part that generates a plurality of reference signals, and a failure detection section that detects a failure of the first waveform generation part or the second waveform generation part on a basis of comparison between the plurality of control signals and the plurality of reference signals.

A first imaging system according to an embodiment of the present disclosure includes an imaging unit that performs imaging of a subject to generate an imaging signal, an arithmetic unit that converts the imaging signal generated by the imaging unit to an image signal, and a display unit that displays an image corresponding to the image signal generated by the arithmetic unit. The imaging unit includes a pixel array including a plurality of pixels, a scanning control section that controls scanning of the plurality of pixels, and a readout control section that controls reading of the plurality of pixels. The imaging unit further includes a first waveform generation part that generates a plurality of control signals for controlling of at least one of the scanning control section or the readout control section, a second waveform generation part that generates a plurality of reference signals, and a failure detection section that detects a failure of the first waveform generation part or the second waveform generation part on a basis of comparison between the plurality of control signals and the plurality of reference signals.

A second imaging system according to an embodiment of the present disclosure includes an imaging unit that performs imaging of a subject to generate an imaging signal, a failure detection unit that detects a failure of the imaging unit, an arithmetic unit that converts the imaging signal generated by the imaging unit to an image signal, and a display unit that displays an image corresponding to the image signal generated by the arithmetic unit. The imaging unit includes a pixel array including a plurality of pixels, a scanning control section that controls scanning of the plurality of pixels, a readout control section that controls reading of the plurality of pixels, a first waveform generation part that generates a plurality of control signals for controlling of at least one of the scanning control section or the readout control section, and a second waveform generation part that generates a plurality of reference signals. The failure detection section detects a failure of the first waveform generation part or the second waveform generation part on a basis of comparison between the plurality of control signals and the plurality of reference signals.

A failure detection method according to an embodiment of the present disclosure includes the following two steps:
(1) generating a plurality of control signals for controlling of at least one of a scanning control section or a readout control section, and a plurality of reference signals, in an imaging device including a pixel array that includes a plurality of pixels, the scanning control section that controls scanning of the plurality of pixels, and the readout control section that controls reading of the plurality of pixels; and
(2) detecting a failure of a first waveform generation part or a second waveform generation part on a basis of comparison between the plurality of control signals and the plurality of reference signals.

In the imaging device, the first and second imaging systems, and the failure detection method according to respective embodiments of the present disclosure, a failure of the first waveform generation part or the second waveform generation part is detected on the basis of comparison between the plurality of control signals and the plurality of reference signals. Thus, for example, setting the reference signal as a signal corresponding to the control signal makes it possible to detect a failure having occurred in any of the first waveform generation part and the second waveform generation part, regardless of whatever the control signal may be.

BRIEF DESCRIPTION OF THE DRAWINGS

FIG. 1 illustrates a schematic configuration example of an imaging system according to an embodiment of the present disclosure.

FIG. 2 illustrates an example of functional blocks of an imaging unit and an arithmetic unit of FIG. 1.

FIG. 3 illustrates an example of a partial circuit configuration inside the imaging unit of FIG. 2.

FIG. 4 illustrates an example of a waveform to be inputted to a failure detection section of FIG. 3.

FIG. 5 illustrates an example of an imaging procedure in the imaging system of FIG. 1.

FIG. 6 illustrates a schematic configuration example of a pixel array section of FIG. 1.

FIG. 7 illustrates an example of a waveform to be inputted to the failure detection section of FIG. 3 in an imaging system provided with the pixel array section of FIG. 6.

FIG. 8 illustrates a modification example of the partial circuit configuration inside the imaging unit of FIG. 2.

FIG. 9 illustrates an example of a waveform to be inputted to a failure detection section of FIG. 8 in an imaging system having the circuit configuration of FIG. 8.

FIG. 10 illustrates a modification example of the partial circuit configuration inside the imaging unit of FIG. 2.

FIG. 11 illustrates an example of a waveform to be inputted to a failure detection section of FIG. 10 in an imaging system having the circuit configuration of FIG. 10.

FIG. 12 illustrates a modification example of the functional blocks of the imaging unit and the arithmetic unit of FIG. 1.

FIG. 13 illustrates an example of a circuit configuration of a control register section and a timing generation section of FIG. 12.

FIG. 14 illustrates an example of the circuit configuration of the control register section and the timing generation section of FIG. 12.

FIG. 15 illustrates an example of a functional block of an imaging system including the failure detection section of FIG. 2 separately from the imaging unit of FIG. 2.

FIG. 16 illustrates an example of a functional block of the imaging system including the failure detection section of FIG. 2 separately from the imaging unit of FIG. 2.

FIG. 17 illustrates a modification example of the functional blocks of the imaging unit and the arithmetic unit of FIG. 2.

FIG. 18 illustrates a modification example of a partial circuit configuration inside the imaging unit of FIG. 17.

FIG. 19 illustrates a modification example of the partial circuit configuration inside the imaging unit of FIG. 17.

FIG. 20 illustrates a modification example of the partial circuit configuration inside the imaging unit of FIG. 17.

FIG. 21 illustrates a modification example of the functional blocks of the imaging unit and the arithmetic unit of FIG. 2.

FIG. 22 illustrates an example of a circuit configuration of a control register section and a timing generation section of FIG. 21.

FIG. 23 illustrates an example of the circuit configuration of the control register section and the timing generation section of FIG. 21.

FIG. 24 illustrates a modification example of the functional block of the imaging system including the failure detection section of FIG. 2 separately from the imaging unit of FIG. 2.

FIG. 25 illustrates a modification example of the functional block of the imaging system including the failure detection section of FIG. 2 separately from the imaging unit of FIG. 2.

FIG. 26 is a block diagram depicting an example of schematic configuration of a vehicle control system.

FIG. 27 is a diagram of assistance in explaining an example of installation positions of an outside-vehicle information detecting section and an imaging section.

MODES FOR CARRYING OUT THE INVENTION

Hereinafter, description is given in detail of an embodiment of the present disclosure with reference to the drawings. The following description is a specific example of the present disclosure, and the present disclosure is not limited to the following aspects. It is to be noted that description is given in the following order.
1. Embodiment (Imaging System) . . . FIGS. 1 to 5
2. Modification Examples (Imaging System) . . . FIGS. 6 to 25
3. Example of Practical Application (Mobile Body) . . . FIGS. 26 and 27

1. Embodiment

[Configuration]
Description is given of an imaging system 1 according to an embodiment of the present disclosure. FIG. 1 illustrates a schematic configuration example of the imaging system 1. The imaging system 1 includes, for example, an imaging unit 10, a display unit 20, and an arithmetic unit 30. The imaging unit 10 performs imaging of a subject to generate an imaging signal, and outputs the generated image signal to the arithmetic unit 30. The arithmetic unit 30 converts the imaging signal generated by the imaging unit 10 to an image signal, and outputs the image signal to the display unit 20. The display unit 20 displays an image corresponding to the image signal generated by the arithmetic unit 30. It is to be noted that the display unit 20 is not an essential component. For example, a front sensing camera to be mounted on a vehicle windshield may be configured by the imaging unit 10 and the arithmetic unit 30.

FIG. 2 illustrates an example of functional blocks of the imaging unit 10 and the arithmetic unit 30. The imaging unit 10 includes, for example, a control signal interface section 11, a control register section 12, a timing generation section 13, a scanning control section 14, a pixel array section 15, a readout control section 16, an output processing section 17, a timing generation section 18, and a failure detection section 19. The arithmetic unit 30 includes, for example, a signal processing section 31 and a control section 32. The control register section 12 and the timing generation section 13 correspond to a specific example of a "first waveform generation part" of the present disclosure. The control register section 12 corresponds to a specific example of a "first register section" of the present disclosure. The timing generation section 13 corresponds to a specific example of a "first timing generation section" of the present disclosure. The timing generation section 18 corresponds to a specific example of a "second waveform generation part" and a "second timing generation section" of the present disclosure.

The control signal interface section 11 receives a set value from the control section 32 of the arithmetic unit 30, for example. The set value includes, for example, data such as a drive pulse for driving the imaging unit 10. The control register section 12 holds a plurality of set values inputted from the control signal interface section 11, and outputs the held plurality of set values to the timing generation sections 13 and 18. The timing generation section 13 controls scanning of each light-receiving pixel inside the pixel array section 15. On the basis of the plurality of set values from the control register section 12, the timing generation section 13 generates various control signals 13A for controlling of the scanning control section 14, and outputs the various control signals 13A to the scanning control section 14 and the failure detection section 19. The timing generation section 13 outputs the plurality of control signals 13A to the scanning control section 14 and the failure detection section 19 in parallel. The control signal 13A corresponds to a specific example of a "control signal" of the present disclosure. On the basis of the plurality of set values from the control register section 12, the timing generation section 13 further generates various control signals 13B that control the readout control section 16, and outputs the various control signals 13B to the readout control section 16. The timing generation section 13 outputs the plurality of control signals 13B to the readout control section 16 in parallel.

The scanning control section 14 controls scanning of a plurality of light-receiving pixels of the pixel array section 15 on the basis of the various control signals 13A from the timing generation section 13. The pixel array section 15 photoelectrically converts an optical image of a subject to generate an imaging signal on the basis of the scanning by the scanning control section 14. The pixel array section 15 outputs the generated imaging signal to the readout control section 16 on the basis of the control by the readout control section 16. The pixel array section 15 includes, for example, the plurality of light-receiving pixels arranged in matrix, and outputs a pixel signal obtained by each light-receiving pixel in time series for each pixel row to thereby generate the imaging signal described above. The readout control section 16 controls reading of the plurality of light-receiving pixels inside the pixel array section 15. On the basis of the various control signals 13B from the timing generation section 13, the readout control section 16 reads the imaging signal from the pixel array section 15, and outputs the read imaging signal to the output processing section 17. The output processing section 17 outputs the signal inputted from the readout control section 16 to the signal processing section 31 of the arithmetic unit 30 in a predetermined transmission scheme. The signal processing section 31 converts the signal from the output processing section 17 to an image signal, and outputs the image signal to the display unit 20.

On the basis of the plurality of set values from the control register section 12, the timing generation section 18 generates a reference signal 18A, and outputs the generated reference signal 18A to the failure detection section 19. The timing generation section 18 serially outputs a plurality of reference signals 18A to the failure detection section 19. The reference signal 18A corresponds to a specific example of a "reference signal" of the present disclosure. In the present embodiment, the timing generation section 18 generates, as the reference signal 18A, a signal in which the various control signals 13A that control the scanning control section 14 are serialized. The failure detection section 19 monitors the various control signals 13A that control the scanning control section 14 to thereby detect a failure of the timing generation section 13 that generates the various control signals 13A. Specifically, the failure detection section 19 detects a failure of the timing generation section 13 or the timing generation section 18 on the basis of comparison between the various control signals 13A inputted from the timing generation section 13 and the reference signal 18A inputted from the timing generation section 18. The failure detection section 19 outputs detection results to the control section 32.

FIG. 3 illustrates an example of a partial circuit configuration inside the imaging unit 10. The control register section 12 includes a plurality of control registers (12a, 12b, 12c, 12d, . . . ). The timing generation section 13 includes a plurality of timing generators (13a, 13b, 13c, 13d, . . . ). The control register section 12 includes the control registers (12a, 12b, 12c, 12d, . . . ) of at least the same number as the number of the control signals 13A to be inputted from the timing generation section 13 to the scanning control section 14. In addition, the timing generation section 13 includes the timing generators (13a, 13b, 13c, 13d, . . . ) of at least the same number as the number (M) of the control signals 13A to be inputted from the timing generation section 13 to the scanning control section 14. It is to be noted that FIG. 3 exemplifies a case where the various control signals 13A to be inputted from the timing generation section 13 to the scanning control section 14 includes signals A, B, C, and D, and where the number (M) of the control signals 13A to be inputted from the timing generation section 13 to the scanning control section 14 is four.

Each of the control registers (12a, 12b, 12c, 12d, . . . ) included in the control register section 12 holds a set value inputted from the control signal interface section 11, and outputs the held set value to the timing generation sections 13 and 18. The control register 12a holds a set value inputted from the control signal interface section 11, and outputs the held set value to the timing generator 13a. The control register 12b holds a set value inputted from the control signal interface section 11, and outputs the held set value to the timing generator 13b. The control register 12c holds a set value inputted from the control signal interface section 11, and outputs the held set value to the timing generator 13c. The control register 12d holds a set value inputted from the control signal interface section 11, and outputs the held set value to the timing generator 13d.

The respective timing generators (13a, 13b, 13c, 13d, . . . ) included in the timing generation section 13 generate the control signals 13A on the basis of the set values from the corresponding control registers (12a, 12b, 12c, 12d, . . . ), and output the generated control signals 13A to the scanning control section 14 and the failure detection section 19. The timing generator 13a generates a signal A as the control signal 13A on the basis of the set value from the corresponding control register 12a, and outputs the signal A to the scanning control section 14 and the failure detection section 19. The timing generator 13b generates a signal B as the control signal 13A on the basis of the set value from the corresponding control register 12b, and outputs the signal B to the scanning control section 14 and the failure detection section 19. The timing generator 13c generates a signal C as the control signal 13A on the basis of the set value from the corresponding control register 12c, and outputs the signal C to the scanning control section 14 and the failure detection section 19. The timing generator 13d generates a signal D as the control signal 13A on the basis of the set value from the corresponding control register 12d, and outputs the signal D to the scanning control section 14 and the failure detection section 19.

The timing generation section 18 includes, for example, a selector 18-1 and a timing generator 18-2. The selector 18-1 sequentially outputs, to the timing generator 18-2, the plurality of set values inputted from the control registers (12a, 12b, 12c, 12d, . . . ) included in the control register section 12 in time series. The timing generator 18-2 generates the reference signal 18A on the basis of the plurality of set values in time series inputted from the selector 18-1, and outputs the generated reference signal 18A to the failure detection section 19.

For example, when the set value to be inputted to the timing generator 13a is inputted, the timing generator 18-2 generates a signal A' corresponding to the signal A to be outputted from the timing generator 13a, and outputs the generated signal A' to the failure detection section 19. For example, when the set value to be inputted to the timing generator 13b is inputted, the timing generator 18-2 generates a signal B' corresponding to the signal B to be outputted from the timing generator 13b, and outputs the generated signal B' to the failure detection section 19. For example, when the set value to be inputted to the timing generator 13c is inputted, the timing generator 18-2 generates a signal C' corresponding to the signal C to be outputted from the timing generator 13c, and outputs the generated signal C' to the failure detection section 19. For example, when the set value to be inputted to the timing generator 13d is inputted, the timing generator 18-2 generates a signal D' corresponding to the signal D to be outputted from the timing generator 13d, and outputs the generated signal D' to the failure detection section 19.

Here, in a case where no error occurs in the timing generator 13a and the timing generation section 18, a waveform of the signal A and a waveform of the signal A' are equal to each other. In a case where no error occurs in the timing generator 13b and the timing generation section 18, a waveform of the signal B and a waveform of the signal B' are equal to each other. In a case where no error occurs in the timing generator 13c and the timing generation section 18, a waveform of the signal C and a waveform of the signal C' are equal to each other. In a case where no error occurs in the timing generator 13d and the timing generation section 18, a waveform of the signal D and a waveform of the signal D' are equal to each other.

In a case where the waveform of the signal A and the waveform of the signal A' are not equal to each other, it is considered that an error has occurred in at least one of the timing generator 13a or the timing generation section 18. In a case where the waveform of the signal B and the waveform of the signal B' are not equal to each other, it is considered that an error has occurred in at least one of the timing generator 13b or the timing generation section 18. In a case where the waveform of the signal C and the waveform of the signal C are not equal to each other, it is considered that an error has occurred in at least one of the timing generator 13c or the timing generation section 18. In a case where the waveform of the signal D and the waveform of the signal D' are not equal to each other, it is considered that an error has occurred in at least one of the tinning generator 13d or the timing generation section 18.

The failure detection section 19 includes, for example, a selector 19a and a comparator 19b. The selector 19a sequentially selects, in time series, the plurality of control signals 13A (signals A, B, C, D, . . . ) inputted in parallel from the respective timing generators (13a, 13b, 13c, 13d, . . . ) included in the timing generation section 13, to thereby output, to the comparator 19b, a control signal 19A in which the plurality of control signals 13A (signals A, B, C, D, . . . ) are serialized. On the basis of comparison between the control signal 19A inputted from the selector 19a and the reference signal 18A inputted from the timing generator 18-2, the comparator 19b detects a failure of the timing generation section 13 or the timing generation section 18. The comparator 19b outputs detection results to the control section 32.

FIG. 4 illustrates an example of a waveform to be inputted to the failure detection section 19. (A) of FIG. 4 exemplifies the plurality of control signals 13A which are outputs of the timing generation section 13. (B) of FIG. 4 exemplifies the reference signal 18A which is an output of the timing generation section 18. The comparator 19b compares the control signal 19A inputted from the selector 19a and the reference signal 18A inputted from the timing generator 18-2 with each other, for example, each time the pixel array section 15 is controlled for each pixel row (line) (i.e., each time a horizontal synchronization signal XHS is outputted). That is, the comparator 19b sequentially compares the control signal 19A and the reference signal 18A with each other at each predetermined cycle.

For example, suppose that, during a period (first period) from the titre when the horizontal synchronization signal XHS is outputted until the time when the next horizontal synchronization signal XHS is outputted, the signal A is inputted from the selector 19a to the comparator 19b, and the signal A' is inputted from the timing generator 18-2 to the comparator 19b. At this time, the comparator 19b determines whether or not the waveforms (e.g., rising timings) of the signal A and the signal A' coincide with each other in the first period. In a case where the waveforms of the signal A and the signal A' coincide with each other, the comparator 19b outputs a signal corresponding to the coincidence. In a case where the waveforms of the signal A and the signal A' do not coincide with each other, the comparator 19b outputs a signal corresponding to the non-coincidence.

For example, suppose that, during a second period subsequent to the first period (period from the time when the horizontal synchronization signal XHS is outputted until the time when the next horizontal synchronization signal XHS is outputted), the signal B is inputted from the selector 19a to the comparator 19b, and the signal B' is inputted from the timing generator 18-2 to the comparator 19b. At this time, the comparator 19b determines whether or not the waveforms (e.g., rising timings) of the signal B and the signal B' coincide with each other in the second period. In a case where the waveforms of the signal B and the signal B' coincide with each other, the comparator 19b outputs a signal corresponding to the coincidence. In a case where the waveforms of the signal B and the signal B' do not coincide with each other, the comparator 19b outputs a signal corresponding to the non-coincidence.

For example, suppose that, during a third period subsequent to the second period (period from the time when the horizontal synchronization signal XHS is outputted until the time when the next horizontal synchronization signal XHS is outputted), the signal C is inputted from the selector 19a to the comparator 19b, and the signal C' is inputted from the timing generator 18-2 to the comparator 19b. At this time, the comparator 19b determines whether or not the waveforms (e.g., timing of falling) of the signal C and the signal C' coincide with each other in the third period. In a case where the waveforms of the signal C and the signal C' coincide with each other, the comparator 19b outputs a signal corresponding to the coincidence. In a case where the waveforms of the signal C and the signal C' do not coincide with each other, the comparator 19b outputs a signal corresponding to the non-coincidence.

For example, suppose that, during a fourth period subsequent to the third period (period from the time when the horizontal synchronization signal XHS is outputted until the time when the next horizontal synchronization signal XHS is outputted), the signal D is inputted from the selector 19a to the comparator 19b, and the signal D' is inputted from the timing generator 18-2 to the comparator 19b. At this time, the comparator 19b determines whether or not the waveforms (peak values) of the signal D and the signal D' coincide with each other in the fourth period. In a case where the waveforms of the signal D and the signal D' coincide with each other, the comparator 19b outputs a signal corresponding to the coincidence. In a case where the waveforms of the signal D and the signal D' do not coincide with each other, the comparator 19b outputs a signal corresponding to the non-coincidence.

Each time M pixel rows (M lines) of the pixel array section 15 are scanned, for example, the comparator 19b makes comparison between all (M) control signals 13A (signals A, B, C, D, . . . ) inputted from the timing generation section 13 and all (M) signals (signals A', B', C', D', . . . ) included in the reference signal 18A inputted from the timing generation section 18.

Next, description is given of an example of an imaging procedure in the imaging system 1.

FIG. 5 illustrates an example of a flowchart of an imaging operation in the imaging system 1. A user operates an unillustrated operation unit to thereby instruct the arithmetic unit 30 to start imaging (step S101). Then, the arithmetic unit 30 transmits an imaging command to the imaging unit 10 (step S102). In the imaging unit 10, upon receiving the imaging command, the failure detection section 19 performs failure determination of the timing generation section 13 or the timing generation section 18 (step S103). In a case where there is no failure in the timing generation section 13 and the timing generation section 18, the failure detection section 19 informs the control section 32 that there is no failure, and the imaging unit 10 executes imaging in a predetermined imaging scheme (step S104).

The imaging unit 10 outputs image data obtained by the imaging to the signal processing section 31. The signal processing section 31 performs predetermined signal processing (e.g., noise reduction processing, etc.) on the basis of the image data inputted from the imaging unit 10 (step S105). The signal processing section 31 stores, in an unillustrated frame memory, the image data subjected to the predetermined signal processing (step S106). In this manner, the imaging in the imaging system 1 is performed. It is to be noted that the failure detection may be performed continuously from the reception of the imaging command by the imaging unit 10 until the completion thereof, or may be performed only at the time of factory shipment of the imaging system 1.

[Effects]

Next, description is given of effects of the imaging system 1 according to the present embodiment.

In a case where an image sensor is used for a use application where a failure is not acceptable, it is required to detect a failure of the image sensor. The image sensor includes, for example, a sensor unit that obtains a captured image, a control circuit that controls the sensor unit, a signal processing circuit that processes the captured image obtained by the sensor unit, and the like. In this case, for example, it is conceivable to detect a failure of the control circuit or the signal processing circuit. Incidentally, unlike the signal processing circuit, the control circuit mounted in the image sensor is less likely to generate an expected value that is uniquely determined. Therefore, there has been an issue in which the failure detection in the control circuit is not easy.

Meanwhile, in the present embodiment, a failure of the timing generation section 13 or the timing generation section 18 is detected on the basis of the comparison between the plurality of control signals 13A and the plurality of reference signals 18A. Thus, for example, setting the reference signal 18A as a signal corresponding to the control signal 13A makes it possible to detect a failure having occurred in any of the timing generation section 13 and the timing generation section 18, regardless of whatever the control signal 13A may be. It is therefore possible to detect a failure of the timing generation section 13 or the timing generation section 18.

In addition, in the present embodiment, the timing generation section 18 is provided that outputs the plurality of reference signals 18A on the basis of a plurality of set values. This makes it possible to reduce circuit size and power consumption of the imaging unit 10, as compared with a case where a control register having a configuration similar to that of the control register section 12 is provided in a preceding stage of the timing generation section 18.

In addition, in the present embodiment, the timing generation section 13 outputs the plurality of control signals 13A in parallel, and the timing generation section 18 outputs the plurality of reference signals 18A serially to compare the control signal 13A and the reference signal 18A with each other, for the control signal 13A and the reference signal 18A of which the set values are in common. This makes it possible to reduce circuit size of the timing generation section 18, as compared with a case where the plurality of reference signals 18A are outputted in parallel.

In addition, in the present embodiment, the comparison between the control signal 13A and the reference signal 18A is sequentially performed at each predetermined cycle. This enables all of the control signals 13A and all of the reference signals 18A to be compared with each other within one frame period in the scanning of the pixel array section 15, in a case where the predetermined cycle is one horizontal period in the scanning of the pixel array section 15 and where the number of the control signals 13A to be outputted from the timing generation section 13 is equal to or less than the number of pixel rows in the pixel array section 15.

2. Modification Examples

[Modification Example A]

In the foregoing embodiment, in a case where the pixel array section 15 includes a special region, the failure detection section 19 may preferentially monitor a signal to serve as special control in the special region. In a case where the pixel array section 15 includes, for example, a shaded pixel region 15a as the special region and an effective pixel region 15b, as illustrated in FIG. 6, the failure detection section 19 may preferentially monitor a signal (e.g., signal B or D) to serve as special control in the shaded pixel region 15a, for example, as illustrated in FIG. 7.

For example, suppose that, during a period (first period), from the time when the horizontal synchronization signal XHS is outputted until the time when the next horizontal synchronization signal XHS is outputted, in which a plurality of shaded pixels pxa included in the shaded pixel region 15a are scanned, the signal B is inputted from the selector 19a to the comparator 19b and the signal B' is inputted from the timing generator 18-2 to the comparator 19b. At this time, the comparator 19b determines whether or not the waveforms (e.g., rising timings) of the signal B and the signal B' coincide with each other in the first period. In a case where the waveforms of the signal B and the signal B' coincide each other, the comparator 19b outputs a signal corresponding to the coincidence. In a case where the waveforms of the signal B and the signal B' do not coincide with each other, the comparator 19b outputs a signal corresponding to the non-coincidence.

For example, suppose that, during a second period subsequent to the first period (period from the time when the horizontal synchronization signal XHS is outputted until the time when the next horizontal synchronization signal XHS is outputted), in which the plurality of shaded pixels pxa included in the shaded pixel region 15a are scanned, the signal D is inputted from the selector 19a to the comparator 19b and the signal D' is inputted from the timing generator 18-2 to the comparator 19b. At this time, the comparator 19b determines whether or not the waveforms (e.g., peak value) of the signal D and the signal D' coincide with each other in the second period. In a case where the waveforms of the signal D and the signal D' coincide with each other, the comparator 19b outputs a signal corresponding to the coincidence. In a case where the waveforms of the signal D and the signal D' do not coincide with each other, the comparator 19b outputs a signal corresponding to the non-coincidence.

For example, suppose that, during a third period subsequent to the second period (period from the time when the horizontal synchronization signal XHS is outputted until the time when the next horizontal synchronization signal XHS is outputted), in which the plurality of shaded pixels pxa included in the shaded pixel region 15a are scanned, the signal A is inputted from the selector 19a to the comparator 19b and the signal A' is inputted from the timing generator 18-2 to the comparator 19b. At this time, the comparator 19b determines whether or not the waveforms (e.g., rising timings) of the signal A and the signal A' coincide with each other in the third period. In a case where the waveforms of the signal A and the signal A' coincide with each other, the comparator 19b outputs a signal corresponding to the coincidence. In a case where the waveforms of the signal A and the signal A' do not coincide with each other, the comparator 19b outputs a signal corresponding to the non-coincidence.

For example, suppose that, during a fourth period in which the scanning of the plurality of shaded pixels pxa included in the shaded pixel region 15a is ended, and scanning of a plurality of effective pixels pxb included in the effective pixel region 15b is started (period from the time when the horizontal synchronization signal XHS is outputted until the time when the next horizontal synchronization signal XHS is outputted), the signal C is inputted from the selector 19a to the comparator 19b and the signal C' is inputted from the timing generator 18-2 to the comparator 19b. At this time, the comparator 19b determines whether or not the waveforms (e.g., rising timings) of the signal C and the signal C' coincide with each other in the fourth period. In a case where the waveforms of the signal C and the signal C' coincide with each other, the comparator 19b outputs a signal corresponding to the coincidence. In a case where the waveforms of the signal C and the signal C' do not coincide with each other, the comparator 19b outputs a signal corresponding to the non-coincidence.

Each time M pixel rows (M lines) of the pixel array section 15 are scanned, for example, the comparator 19b makes comparison between all the (M) control signals 13A (signals A, B, C, D, . . . ) inputted from the timing generation section 13 and all the (M) signals (signals A', B', C', D', . . . ) included in the reference signal 18A inputted from the timing generation section 18.

In the present modification example, in a case where the pixel array section 15 includes a special region such as the shaded pixel region 15a, a signal to serve as special control in the special region is preferentially monitored. This makes it also possible to reliably detect an error caused by the special control.

[Modification Example B]

In the foregoing embodiment and the modification example thereof, the timing generation section 18 may have a configuration common to that of the timing generation section 13, for example, as illustrated in FIG. 8. In the present modification example, the timing generation section 18 includes a plurality of timing generators (18a, 18b, 18c, 18d, . . . ). The timing generation section 18 includes the timing generators of at least the same number as the number (M) of the control signals 13A to be inputted from the timing generation section 13 to the scanning control section 14. It is to be noted that FIG. 8 exemplifies a case where various reference signals 18A to be inputted from the timing generation section 18 to the failure detection section 19 includes signals A', B', C', and D', and where the number (M) of the reference signals 18A to be inputted from the timing generation section 18 to the comparator 19b is four. Each of the timing generators (13a, 13b, 13c, 13d, . . . ) included in lie timing generation section 18 generates the reference signal 18A on the basis of a set value from the corresponding control register, and outputs the generated reference signal 18A to the comparator 19b. The timing generation section 18 outputs the plurality of reference signals 18A to the comparator 19b in parallel.

The respective timing generators (18a, 18b, 18c, 18d, . . . ) included in the timing generation section 18 generate the reference signals 18A on the basis of the set values from the corresponding control registers (12a, 12b, 12c, 12d, . . . ), and output the generated reference signals 18A to the failure detection section 19. The timing generator 18a generates a signal A' as the reference signal 18A on the basis of the set value from the corresponding control register 12a, and outputs the signal A' to the failure detection section 19. The timing generator 18b generates a signal B' as the reference signal 18A on the basis of the set value from the corresponding control register 12b, and outputs the signal B' to the failure detection section 19. The timing generator 18c generates a signal C' as the reference signal 18A on the basis of the set value from the corresponding control register 12c, and outputs the signal C' to the failure detection section 19. The timing generator 18d generates a signal D' as the reference signal 18A on the basis of the set value from the corresponding control register 12d, and outputs the signal D' to the failure detection section 19.

In the present modification example, the failure detection section 19 includes, for example, selectors 19a and 19c and the comparator 19b. The selector 19c sequentially selects, in time series, the plurality of reference signals 18A (signals A', B', C', D', . . . ) inputted in parallel from the respective timing generators (18a, 18b, 18c, 18d, . . . ) included in the timing generation section 18, to thereby output, to the comparator 19b, a reference signal 19B in which the plurality of reference signals 18A (signals A', B', C', D', . . . ) are serialized. On the basis of comparison between the control signal 19A inputted from the selector 19a and the reference signal 19B inputted from the selector 19c, the comparator 19b detects a failure of the timing generation section 13 or the timing generation section 18. The comparator 19b outputs detection results to the control section 32.

FIG. 9 illustrates an example of a waveform to be inputted to the failure detection section 19. (A) of FIG. 9 exemplifies the plurality of control signals 13A which are outputs of the timing generation section 13. (B) of FIG. 9 exemplifies the reference signals 18A which are outputs of the timing generation section 18. The comparator 19b compares the control signal 19A inputted from the selector 19a and the reference signal 19B inputted from the selector 19c with each other, for example, each time the pixel array section 15 is controlled for each pixel row (line) (i.e., each time the horizontal synchronization signal XHS is outputted).

For example, suppose that, during a period (first period) from the time when the horizontal synchronization signal XHS is outputted until the time when the next horizontal synchronization signal XHS is outputted, the signal A is inputted from the selector 19a to the comparator 19b, and the signal A' is inputted from the selector 19c to the comparator 19b. At this time, the comparator 19b determines whether or not rising timings of the signal A and the signal A' coincide with each other in the first period. In a case where the rising tunings of the signal A and the signal A' coincide with each other, the comparator 19b outputs a signal corresponding to the coincidence. In a case where the rising timings of the signal A and the signal A' do not coincide with each other, the comparator 19b outputs a signal corresponding to the non-coincidence.

For example, suppose that, during a second period subsequent to the first period (period from the time when the horizontal synchronization signal XHS is outputted until the time when the next horizontal synchronization signal XHS is outputted), the signal B is inputted from the selector 19a to the comparator 19b, and the signal B' is inputted from the selector 19c to the comparator 19b. At this time, the comparator 19b determines whether or not rising timings of the signal B and the signal B' coincide with each other in the second period. In a case where the rising timings of the signal B and the signal B' coincide with each other, the comparator 19b outputs a signal corresponding to the coincidence. In a case where the rising timings of the signal B and the signal B' do not coincide with each other, the comparator 19b outputs a signal corresponding to the non-coincidence.

For example, suppose that, during a third period subsequent to the second period (period from the time when the horizontal synchronization signal XHS is outputted until the time when the next horizontal synchronization signal XHS is outputted), the signal C is inputted from the selector 19a to the comparator 19b, and the signal C' is inputted from the selector 19c to the comparator 19b. At this time, the comparator 19b determines whether or not rising timings of the signal C and the signal C' coincide with each other in the third period. In a case where the rising timings of the signal C and the signal C' coincide with each other, the comparator 19b outputs a signal corresponding to the coincidence. In a case where the rising timings of the signal C and the signal C' do not coincide with each other, the comparator 19b outputs a signal corresponding to the non-coincidence.

For example, suppose that, during a fourth period subsequent to the third period (period from the time when the horizontal synchronization signal XHS is outputted until the time when the next horizontal synchronization signal XHS is outputted), the signal D is inputted from the selector 19a to the comparator 19b, and the signal D' is inputted from the selector 19c to the comparator 19b. At this time, the comparator 19b determines whether or not rising timings of the signal D and the signal D' coincide with each other in the fourth period. In a case where the rising timing of the signal D and the signal D' coincide with each other, the comparator 19b outputs a signal corresponding to the coincidence. In a case where the rising timings of the signal D and the signal D' do not coincide with each other, the comparator 19b outputs a signal corresponding to the non-coincidence.

Each time M pixel rows (M lines) of the pixel array section 15 are scanned, for example, the comparator 19b performs comparison between all the (M) control signals 13A (signals A, B, C, D, . . . ) inputted from the timing generation section 13 and all the (M) signals (signals A', B', C', D', . . . ) included in the reference signal 18A inputted from the tuning generation section 18.

In addition, in the present modification example, the timing generation section 13 outputs the plurality of control signals 13A in parallel, and the timing generation section 18 outputs the plurality of reference signals 18A in parallel to compare the control signal 13A and the reference signal 18A with each other, for the control signal 13A and the reference signal 18A of which the set values are in common. This enables control of the timing generation section 18 under a control similar to the control of the timing generation section 13, thus making it possible to compare the control signal 19A and the reference signal 19B with each other in a common condition.

[Modification Example C]

In the foregoing Modification Example B, the failure detection section 19 may include, for example, a comparator 19d instead of the selectors 19a and 19c and the comparator 19b as illustrated in FIG. 10. The comparator 19d detects a failure of the timing generation section 13 or the timing generation section 18 on the basis of comparison between the plurality of control signals 13A (signals A, B, C, D, . . . ) inputted in parallel from the respective timing generators (13a, 13b, 13c, 13d, . . . ) included in the timing generation section 13 and the plurality of reference signals 18A (signals A, B, C, D, . . . ) inputted in parallel from the respective timing generators (18a, 18b, 18c, 18d, . . . ) included in the timing generation section 18. The comparator 19d outputs detection results to the control section 32.

FIG. 11 illustrates an example of a waveform to be inputted to the failure detection section 19. (A) of FIG. 11 exemplifies the plurality of control signals 13A which are outputs of the timing generation section 13. (B) of FIG. 11 exemplifies the plurality of reference signals 18A which are outputs of the timing generation section 18. The comparator 19d compares the control signal 13A inputted from the timing generation section 13 and the reference signal 18A inputted from the timing generation section 18 with each other, for example, each time the pixel array section 15 is controlled for each pixel row (line) (i.e., each time the horizontal synchronization signal XHS is outputted).

For example, suppose that, during a period (first period) from the time when the horizontal synchronization signal XHS is outputted until the time when the next horizontal synchronization signal XHS is outputted, the signals A, B, C, and D are inputted from the timing generators 13a, 13b, 13c, and 13d to the comparator 19d, and the signals A', B', C', and D' are inputted from the timing generators 18a, 18b, 18c, and 18d to the comparator 19d. At this time, the comparator 19d simultaneously determines whether or not the waveforms of the signal A and the signal A' coincide with each other, whether or not the waveforms of the signal B and the signal B' coincide with each other, whether or not the waveforms of the signal C and the signal C' coincide with each other, and whether or not the waveforms of the signal D and the signal D' coincide with each other, in the first period.

In a case where the waveforms of the signal A and the signal A' coincide with each other, the comparator 19d outputs a signal corresponding to the coincidence. In a case where the waveforms of the signal A and the signal A' do not coincide with each other, the comparator 19d outputs a signal corresponding to the non-coincidence. In a case where the waveforms of the signal B and the signal B' coincide with each other, the comparator 19d outputs a signal corresponding to the coincidence. In a case where the waveforms of the signal B and the signal B' do not coincide with each other, the comparator 19d outputs a signal corresponding to the non-coincidence. In a case where the waveforms of the signal C and the signal C' coincide with each other, the comparator 19d outputs a signal corresponding to the coincidence. In a case where the waveforms of the signal C and the signal C' do not coincide with each other, the comparator 19d outputs a signal corresponding to the non-coincidence. In a case where the waveforms of the signal D and the signal D' coincide with each other, the comparator 19d outputs a signal corresponding to the coincidence. In a case where the waveforms of the signal D and the signal D' do not coincide with each other, the comparator 19d outputs a signal corresponding to the non-coincidence.

For example, also in the second period subsequent to the first period (period from the time when the horizontal synchronization signal XHS is outputted until the time when the next horizontal synchronization signal XHS is outputted), the comparator 19d compares the signals A, B, C and D and the signals A', B', C' and D' with each other. That is, as for the comparator 19d, at a cycle equal to the cycle at which the horizontal synchronization signal XHS is outputted, the comparator 19d compares the signals A, B, C and D and the signals A', B', C' and D' with each other.

Each time one pixel row (one line) of the pixel array section 15 is scanned, for example, the comparator 19d makes comparison between all the (M) control signals 13A (signals A, B, C, D, . . . ) inputted from the timing generation section 13 and all (M) reference signals 18A (signals A', B', C', D', . . . ) inputted from the timing generation section 18.

In the present modification example, at a cycle equal to the cycle at which the horizontal synchronization signal XHS is outputted, the signals A, B, C and D and the signals A', B', C' and D' are compared with each other. This makes it possible to detect a failure of the timing generation section 13 or the timing generation section 18 in an early stage as compared with the foregoing embodiment.

[Modification Example D]

In the foregoing Modification Examples B and C, the imaging unit 10 may further include a control register section 21, for example, as illustrated in FIG. 12. In the present modification example, the control register section 21 and the timing generation section 18 correspond to a specific example of a "second waveform generation part" of the present disclosure. The control register section 21 corresponds to a specific example of a "second register section" of the present disclosure. The timing generation section 18 corresponds to a specific example of a "second timing generation section" of the present disclosure.

The control register section 21 holds a plurality of set values (second set values) inputted from the control signal interface section 11, and outputs the held plurality of set values to the timing generation section 18. The control register section 21 outputs the plurality of set values to the timing generation section 18 on the basis of the same control as that of the control register section 12. The timing generation section 18 outputs the plurality of reference signals 18A on the basis of the plurality of set values inputted from the control register section 21. The control register section 12 holds a plurality of set values (first set values) inputted from the control signal interface section 11, and outputs the held plurality of set values to the timing generation section 13. That is, in the present modification example, the control register section 12 does not output the held plurality of set values to the timing generation section 18. The timing generation section 13 outputs the plurality of control signals 13A on the basis of the plurality of set values inputted from the control register section 12.

FIGS. 13 and 14 each illustrate an example of a partial circuit configuration inside the imaging unit 10. The control register section 21 has a configuration common to that of the control register section 12. The control register section 21 includes a plurality of control registers (21a, 21b, 21c, 21d, . . . ). The control register section 21 includes control registers of at least the same number as the number of the control signals 13A to be inputted from the timing generation section 13 to the scanning control section 14. Each of the control registers (21a, 21b, 21c, 21d, . . . ) included in the control register section 21 holds a set value inputted from the control signal interface section 11, and outputs the held set value to the timing generation section 18.

In the present modification example, in a case where the timing generation section 18 includes the selector 18-1 and the timing generator 18-2, the selector 18-1 sequentially outputs, to the timing generator 18-2, the plurality of set values inputted from the control registers (21a, 21b, 21c, 21d, . . . ) included in the control register section 21 in time series as illustrated in FIG. 13.

In the present modification example, in a case where the timing generation section 18 includes the plurality of timing generators (18a, 18b, 18c, 18d, . . . ), each of the timing generators (18a, 18b, 18c, 18d, . . . ) included in the timing generation section 18 generates the reference signal 18A on the basis of the set values from the corresponding control registers (21a, 21b, 21c, 21d, . . . ) as illustrated in FIG. 14, and outputs the generated reference signal 18A to the failure detection section 19.

In the present modification example, the control register section 21 that outputs a set value on the basis of the same control as that of the control register section 12, and the timing generation section 18 that outputs the reference signal 18A on the basis of the set value inputted from the control register section 21 are provided. Thus, in the present modification example, a redundant circuit (the control register section 21 and the timing generation section 18) is provided; however, providing such a redundant circuit makes it possible to detect a failure of the control register section 12 and the timing generation section 13.

In addition, in the present modification example, in a case where the timing generation section 13 outputs the plurality of control signals 13A in parallel, and the timing generation section 18 outputs the plurality of reference signals 18A serially to compare the control signal 13A and the reference signal 18A with each other, for the control signal 13A and the reference signal 18A of which the set values are in common, it is possible to reduce circuit size of the timing generation section 18, as compared with a case where the plurality of reference signals 18A are outputted in parallel.

In addition, in the present modification example, in a case where the timing generation section 13 outputs the plurality of control signals 13A in parallel, and the timing generation section 18 outputs the plurality of reference signals 18A in parallel to compare the control signal 13A and the reference signal 18A with each other, for the control signal 13A and the reference signal 18A of which the set values are in common, it is possible to control the timing generation section 18 under a control similar to the control of the timing generation section 13.

[Modification Example E]

In the foregoing embodiment and the foregoing Modification Examples A to C, a failure detection unit 40 having a function similar to that of the failure detection section 19 may be provided separately from the imaging unit 10, for example, as illustrated in FIG. 15. Also in such a case, effects similar to those of the foregoing embodiment and the foregoing Modification Examples A to C are achieved.

[Modification Example F]

In the foregoing Modification Example D, the failure detection unit 40 having a function similar to that of the failure detection section 19 may be provided separately from the imaging unit 10, for example, as illustrated in FIG. 16. Also in such a case, effects similar to those of the foregoing Modification Example D are achieved.

[Modification Example G]

In the foregoing embodiment and the foregoing Modification Examples A to C, the failure detection section 19 monitors the various control signals 13A that control the scanning control section 14 to thereby detect a failure of the timing generation section 13 that generates the various control signals 13A. However, in the foregoing embodiment and the foregoing Modification Examples A to C, the failure detection section 19 may monitor the various control signals 13B that control the readout control section 16 to thereby detect a failure of the timing generation section 13 that generates the various control signals 13B, for example, as illustrated in FIG. 17. The control signal 13B corresponds to a specific example of a "control signal" of the present disclosure.

At this time, on the basis of the set value from the control register section 12, the timing generation section 18 generates a reference signal 18B, and outputs the reference signal 18B to the failure detection section 19. The reference signal 18B corresponds to a specific example of a "reference signal" of the present disclosure. The timing generation section 18 generates, as the reference signal 18B, a control signal in which various control signals that control the readout control section 16 are serialized. The failure detection section 19 detects a failure of the timing generation section 13 or the timing generation section 18 on the basis of comparison between the various control signals 13B inputted from the timing generation section 13 and the reference signal 18A inputted from the timing generation section 18. The failure detection section 19 outputs detection results to the control section 32.

FIG. 18 illustrates an example of a partial circuit configuration inside the imaging unit 10. The control register section 12 includes a plurality of control registers (12e, 12f, 12g, 12h, . . . ). The timing generation section 13 includes a plurality of timing generators (13e, 13f, 13g, 13h, . . . ). The control register section 12 includes control registers of at least the same number as the number of the control signals 13B to be inputted from the timing generation section 13 to the readout control section 16. In addition, the timing generation section 13 includes the timing generators of at least the same number as the number (L) of the control signals 13B to be inputted from the timing generation section 13 to the readout control section 16. It is to be noted that FIG. 18 exemplifies a case where various control signals 13B to be inputted from the timing generation section 13 to the readout control section 16 includes signals E, F, G, and H, and where the number (L) of the control signals 13B to be inputted from the timing generation section 13 to the readout control section 16 is four.

Each of the control registers (12e, 12f, 12g, 12h, . . . ) included in the control register section 12 holds a set value inputted from the control signal interface section 11, and outputs the held set value to the timing generation sections 13 and 18. Each of the timing generators (13e, 13f, 13g, 13h, . . . ) included in the timing generation section 13 generates the control signal 13B on the basis of the set value from the corresponding control register, and outputs the generated control signal 13B to the readout control section 16.

The timing generation section 18 includes, for example, a selector 18-3 and a timing generator 18-4. The selector 18-3 sequentially outputs, to the timing generator 18-4, the plurality of set values inputted from the control registers (12e, 12f, 12g, 12h, . . . ) included in the control register section 12 in time series. The timing generator 18-4 generates the reference signal 18B on the basis of the set values in time series inputted from the selector 18-3, and outputs the generated reference signal 18B to the failure detection section 19.

For example, when the set value to be inputted to the timing generator 13e is inputted, the timing generator 18-4 generates a signal E' corresponding to the signal E to be outputted from the timing generator 13e, and outputs the generated signal E' to the failure detection section 19. For example, when the set value to be inputted to the timing generator 13f is inputted, the timing generator 18-4 generates a signal F' corresponding to the signal F to be outputted from the timing generator 13f, and outputs the generated signal F' to the failure detection section 19. For example, when the set value to be inputted to the timing generator 13g is inputted, the timing generator 18-4 generates a signal G' corresponding to the signal G to be outputted from the timing generator 13g, and outputs the generated signal G' to the failure detection section 19. For example, when the set value to be inputted to the timing generator 13h is inputted, the timing generator 18-4 generates a signal H' corresponding to the signal H to be outputted from the timing generator 13h, and outputs the generated signal H' to the failure detection section 19.

Here, in a case where no error occurs in the timing generator 13e and the timing generation section 18, a waveform of the signal E and a waveform of the signal E' are equal to each other. In a case where no error occurs in the timing generator 13f and the timing generation section 18, a waveform of the signal F and a waveform of the signal F' are equal to each other. In a case where no error occurs in the timing generator 13g and the timing generation section 18, a waveform of the signal G and a waveform of the signal G' are equal to each other. In a case where no error occurs in the timing generator 13h and the timing generation section 18, a waveform of the signal H and a waveform of the signal H' are equal to each other.

In a case where the waveform of the signal E and the waveform of the signal E' are not equal to each other, it is considered that an error has occurred in at least one of the timing generator 13e or the timing generation section 18. In a case where the waveform of the signal F and the waveform of the signal F' are not equal to each other, it is considered that an error has occurred in at least one of the timing generator 13f or the timing generation section 18. In a case where the waveform of the signal G and the waveform of the signal G' are not equal to each other, it is considered that an error has occurred in at least one of the timing generator 13g or the timing generation section 18. In a case where the waveform of the signal H and the waveform of the signal H' are not equal to each other, it is considered that an error has occurred in at least one of the timing generator 13h or the timing generation section 18.

The failure detection section 19 includes, for example, a selector 19e and a comparator 19f. The selector 19e sequentially selects, in time series, the plurality of control signals 13B (signals A, B, C, D, . . . ) inputted in parallel from the respective timing generators (13e, 13f, 13g, 13h, . . . ) included in the timing generation section 13, to thereby output, to the comparator 19f, a control signal 19C in which the plurality of control signals 13B (signals A, B, C, D, . . . ) are serialized. On the basis of comparison between the control signal 19C inputted from the selector 19e and the reference signal 18B inputted from the timing generator 18-4, the comparator 19f detects a failure of the timing generation section 13 or the timing generation section 18. The comparator 19b outputs detection results to the control section 32. A failure detection method in the failure detection section 19 is similar to the failure detection method in the foregoing embodiment.

In the present modification example, a failure of the timing generation section 13 or the timing generation section 18 is detected on the basis of the comparison between the plurality of control signals 13B and the plurality of reference signals 18B. Thus, for example, setting the reference signal 18B as a signal corresponding to the control signal 13B makes it possible to detect a failure having occurred in any of the timing generation section 13 and the timing generation section 18, regardless of whatever the control signal 13B may be. It is therefore possible to detect a failure of the timing generation section 13 or the timing generation section 18.

In addition, in the present modification example, the timing generation section 18 is provided that outputs the plurality of reference signals 18B on the basis of a plurality of set values. This makes it possible to reduce circuit size and power consumption of the imaging unit 10, as compared with a case where a control register having a configuration similar to that of the control register section 12 is provided in a preceding stage of the timing generation section 18.

In addition, in the present modification example, the timing generation section 13 outputs the plurality of control signals 13B in parallel, and the timing generation section 18 outputs the plurality of reference signals 18B serially to compare the control signal 13B and the reference signal 18B with each other, for the control signal 13B and the reference signal 18B of which the set values are in common. This makes it possible to reduce circuit size of the timing generation section 18, as compared with a case where the plurality of reference signals 18B are outputted in parallel.

In addition, in the present modification example, the comparison between the control signal 13B and the reference signal 18B is sequentially performed at each predetermined cycle. This enables all of the control signals 13B and all of the reference signals 18B to be compared with each other within one frame period in the scanning of the pixel array section 15, in a case where the predetermined cycle is one horizontal period in the scanning of the pixel array section 15 and where the number of the control signals 13B to be outputted from the timing generation section 13 is equal to or less than the number of pixel rows in the pixel array section 15.

[Modification Example H]

In the foregoing Modification Example G, the timing generation section 18 may have a configuration common to that of the timing generation section 13, for example, as illustrated in FIG. 19. In the present modification example, the timing generation section 18 includes a plurality of timing generators (18e, 18f, 18g, 18h, . . . ). The timing generation section 18 includes the timing generators of at least the same number as the number (L) of the control signals 13B to be inputted from the timing generation section 13 to the readout control section 16. It is to be noted that FIG. 19 exemplifies a case where various reference signals 18A to be inputted from the timing generation section 18 to the comparator 19b includes signals E, F, G, and H, and where the number (L) of the reference signals 18B to be inputted from the timing generation section 18 to the comparator 19b is four. Each of the timing generators (13e, 13f, 13g, 13h, . . . ) included in the timing generation section 18 generates the reference signal 18B on the basis of a set value from the corresponding control register, and outputs the generated reference signal 18B to the comparator 19f.

The respective timing generators (18e, 18f, 18g, 18h, . . . ) included in the timing generation section 18 generate the reference signals 18B on the basis of the set values from the corresponding control registers (12e, 12f, 12g, 12h, . . . ), and output the generated reference signals 18B to the failure detection section 19. The timing generator 18e generates a signal E' as the reference signal 18B on the basis of the set value from the corresponding control register 12e, and outputs the signal E' to the failure detection section 19. The timing generator 18f generates a signal F' as the reference signal 18B on the basis of the set value from the corresponding control register 12f, and outputs the signal F' to the failure detection section 19. The timing generator 18g generates a signal G' as the reference signal 18B on the basis of the set value from the corresponding control register 12g, and outputs the signal G' to the failure detection section 19. The tinning generator 18h generates a signal H' as the reference signal 18B on the basis of the set value from the corresponding control register 12h, and outputs the signal H' to the failure detection section 19.

In the present modification example, the failure detection section 19 includes, for example, selectors 19e and 19g and the comparator 19f. The selector 19g sequentially selects, in time series, the plurality of reference signals 18B (signals E, F, G, H, . . . ) inputted in parallel from the respective turning generators (18e, 18f, 18g, 18h, . . . ) included in the timing generation section 18, to thereby output, to the comparator 19f, a control signal 19D in which the plurality of reference signals 18B (signals E, F, G, H, . . . ) are serialized. On the basis of comparison between the reference signal 19C inputted from the selector 19e and the control signal 19D inputted from the selector 19g, the comparator 19f detects a failure of the timing generation section 13 or the timing generation section 18. The comparator 19f outputs detection results to the control section 32. A failure detection method in the failure detection section 19 is similar to the failure detection method in the foregoing Modification Example B.

In the present modification example, the timing generation section 13 outputs the plurality of control signals 13B in parallel, and the timing generation section 18 outputs the plurality of reference signals 18B in parallel to compare the control signal 13B and the reference signal 18B with each other, for the control signal 13B and the reference signal 18B of which the set values are in common. This enables control of the timing generation section 18 under a control similar to the control of the timing generation section 13.

[Modification Example I]

In the foregoing Modification Example H, the failure detection section 19 may include, for example, a comparator 19h instead of the selectors 19e and 19g and the comparator 19f as illustrated in FIG. 20. The comparator 19h detects a failure of the timing generation section 13 or the timing generation section 18 on the basis of comparison between the plurality of control signals 13B (signals E, F, G, H, . . . ) inputted in parallel from the respective timing generators (13e, 13f, 13g, 13h, . . . ) included in the timing generation section 13 and the plurality of reference signals 18B (signals E, F, G, H, . . . ) inputted in parallel from the respective timing generators (18e, 18f, 18g, 18h, . . . ) included in the timing generation section 18. The comparator 19h outputs detection results to the control section 32. A failure detection method in the failure detection section 19 is similar to the failure detection method in the foregoing Modification Example C.

In the present modification example, at a cycle equal to the cycle at which the horizontal synchronization signal XHS is outputted, the signals A, B, C and D and the signals A', B', C' and D' are compared with each other. This makes it possible to detect a failure of the timing generation section 13 or the timing generation section 18 in an early stage as compared with the foregoing embodiment.

[Modification Example J]

In the foregoing Modification Examples H and I, the imaging unit 10 may further include the control register section 21, for example, as illustrated in FIG. 21. The control register section 21 holds a set value inputted from the control signal interface section 11, and outputs the held set value to the timing generation section 18. In the present modification example, the control register section 12 holds a set value inputted from the control signal interface section 11, and outputs the held set value to the timing generation section 13. That is, in the present modification example, the control register section 12 does not output the held set value to the timing generation section 18.

FIGS. 22 and 23 each illustrate an example of a partial circuit configuration inside the imaging unit 10. The control register section 21 has a configuration common to that of the control register section 12. The control register section 21 includes a plurality of control registers (21e, 21f, 21g, 21h, . . . ). The control register section 21 includes control registers of at least the same number as the number of the control signals 13A to be inputted from the timing generation section 13 to the scanning control section 14. Each of the control registers (21e, 21f, 21g, 21h, . . . ) included in the control register section 21 holds a set value inputted from the control signal interface section 11, and outputs the held set value to the timing generation section 18.

In the present modification example, in a case where the timing generation section 18 includes the selector 18-3 and the timing generator 18-4, the selector 18-3 outputs, to the timing generator 18-2, the plurality of set values inputted from the control registers (21e, 21f, 21g, 21h, . . . ) included in the control register section 21 in time series as illustrated in FIG. 22.

In the present modification example, in a case where the timing generation section 18 includes the plurality of timing generators (18e, 18f, 18g, 18h, . . . ), each of the timing generators (18e, 18f, 18g, 18h, . . . ) included in the timing generation section 18 generates the reference signal 18A on the basis of the set values from the corresponding control registers (21e, 21f, 21g, 21h, . . . ) as illustrated in FIG. 23, and outputs the generated reference signal IRA to the failure detection section 19.

In the present modification example, the control register section 21 that outputs a set value on the basis of the same control as that of the control register section 12, and the timing generation section 18 that outputs the reference signal 18B on the basis of the set value inputted from the control register section 21 are provided. Thus, in the present modification example, a redundant circuit (the control register section 21 and the timing generation section 18) is provided; however, providing such a redundant circuit makes it possible to detect a failure of the control register section 12 and the timing generation section 13.

In addition, in the present modification example, in a case where the timing generation section 13 outputs the plurality of control signals 13B in parallel, and the timing generation section 18 outputs the plurality of reference signals 18B serially to compare the control signal 13B and the reference signal 18B with each other, for the control signal 13B and the reference signal 18B of which the set values are in common, it is possible to reduce circuit size of the timing generation section 18, as compared with a case where the plurality of reference signals 18B are outputted in parallel.

In addition, in the present modification example, in a case where the timing generation section 13 outputs the plurality of control signals 13B in parallel, and the timing generation section 18 outputs the plurality of reference signals 18B in parallel to compare the control signal 13B and the reference signal 18B with each other, for the control signal 13B and the reference signal 18B of which the set values are in common, it is possible to control the timing generation section 18 under a control similar to the control of the timing generation section 13.

[Modification Example K]

In the foregoing Modification Examples H and I, a failure detection unit 40 having a function similar to that of the failure detection section 19 may be provided separately from the imaging unit 10, for example, as illustrated in FIG. 24. Also in such a case, effects similar to those of the foregoing Modification Examples H and I are achieved.

[Modification Example L]

In the foregoing Modification Example J, the failure detection unit 40 having a function similar to that of the failure detection section 19 may be provided separately from the imaging unit 10, for example, as illustrated in FIG. 25. Also in such a case, effects similar to those of the foregoing Modification Example J are achieved.

3. Example of Practical Application

The technology according to an embodiment of the present disclosure (present technology) is applicable to various products. For example, the technology according to an embodiment of the present disclosure may be achieved in the form of an apparatus to be mounted to a mobile body of any kind. Non-limiting examples of the mobile body may include an automobile, an electric vehicle, a hybrid electric vehicle, a motorcycle, a bicycle, any personal mobility device, an airplane, an unmanned aerial vehicle (drone), a vessel, and a robot.

FIG. 26 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 26, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 26, an audio speaker 12061, a display section 12062, and an instrument panel 12063 are illustrated as the output device. The display section 12062 may, for example, include at least one of an on-board display and a head-up display.

FIG. 27 is a diagram depicting an example of the installation position of the imaging section 12031.

In FIG. 27, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 27 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle

12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously-without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle, in a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The description has been given hereinabove of one example of the vehicle control system, to which the technology according to an embodiment of the present disclosure may be applied. The technology according to an embodiment of the present disclosure may be applied to the imaging section 12031 and the imaging sections 12101 to 12104 among components of the configuration described above. The application of the technology according to an embodiment of the present disclosure to the imaging section 12031 and the imaging sections 12101 to 12104 allows for achievement of the vehicle control system with less concern about a failure for the imaging section 12031 and the imaging sections 12101 to 12104.

Although the description has been given hereinabove of the present disclosure with reference to the embodiment and modification examples thereof, and the practical application example, the present disclosure is not limited to the foregoing embodiments, etc., and various modifications may be made. It is to be noted that the effects described herein are merely illustrative. The effects of the present disclosure are not limited to those described herein. The present disclosure may have other effects than those described herein.

In addition, the present disclosure may also have the following configurations.

(1)

An imaging device including:

a pixel array including a plurality of pixels;

a scanning control section that controls scanning of the plurality of pixels;

a readout control section that controls reading of the plurality of pixels;

a first waveform generation part that generates a plurality of control signals for controlling of at least one of the scanning control section or the readout control section;

a second waveform generation part that generates a plurality of reference signals; and a failure detection section that detects a failure of the first waveform generation part or the second waveform generation part on a basis of comparison between the plurality of control signals and the plurality of reference signals.

(2)

The imaging device according to (1), in which the first waveform generation part includes a first register section that outputs a plurality of set values, and a first timing generation section that outputs the plurality of control signals on a basis of the plurality of set values, and the second waveform generation part includes a second timing generation section that outputs the plurality of reference signals on a basis of the plurality of set values.

(3)

The imaging device according to (2), in which the first timing generation section outputs the plurality of control signals in parallel, the second timing generation section outputs the plurality of reference signals serially or in parallel, and the failure detection section compares the control signal and the reference signal with each other, for the control signal and the reference signal of which the set values are in common.

(4)

The imaging device according to (3), in which the failure detection section sequentially compares the control signal and the reference signal with each other at each predetermined cycle.

(5)

The imaging device according to (1), in which the first waveform generation part includes a first register section that outputs a first set value, and a first timing generation section that outputs the control signal on a basis of the first set value, and the second waveform generation part includes a second register section that outputs a second set value on a basis of same control as the first register section, and a second timing generation section that outputs the reference signal on a basis of the second set value.

(6)

The imaging device according to (5), in which the first timing generation section outputs the plurality of control signals in parallel, the second timing generation section outputs the plurality of reference signals serially or in parallel, and the failure detection section compares the control signal and the reference signal with each other, for the control signal and the reference signal of which the set values are in common.

(7)

The imaging device according to (6), in which the failure detection section sequentially compares the control signal and the reference signal with each other at each predetermined cycle.

(8)

An imaging system including:
an imaging unit that performs imaging of a subject to generate an imaging signal;
an arithmetic unit that converts the imaging signal generated by the imaging unit to an image signal, and
a display unit that displays an image corresponding to the image signal generated by the arithmetic unit,
the imaging unit including
a pixel including a plurality of pixels,
a scanning control section that controls scanning of the plurality of pixels,
a readout control section that controls reading of the plurality of pixels,
a first waveform generation part that generates a plurality of control signals for controlling of at least one of the scanning control section or the readout control section,
a second waveform generation part that generates a plurality of reference signals, and
a failure detection section that detects a failure of the first waveform generation part or the second waveform generation part on a basis of comparison between the plurality of control signals and the plurality of reference signals.

(9)

An imaging system including:
an imaging unit that performs imaging of a subject to generate an imaging signal;
a failure detection unit that detects a failure of the imaging unit;
an arithmetic unit that converts the imaging signal generated by the imaging unit to an image signal; and
a display unit that displays an image corresponding to the image signal generated by the arithmetic unit,
the imaging unit including
a pixel array including a plurality of pixels,
a scanning control section that controls scanning of the plurality of pixels,
a readout control section that controls reading of the plurality of pixels,
a first waveform generation part that generates a plurality of control signals for controlling of at least one of the scanning control section or the readout control section, and
a second waveform generation part that generates a plurality of reference signals,
the failure detection unit detecting a failure of the first waveform generation part or the second waveform generation part on a basis of comparison between the plurality of control signals and the plurality of reference signals.

(10)

A failure detection method, in an imaging device including a pixel array that includes a plurality of pixels, a scanning control section that controls scanning of the plurality of pixels, and a readout control section that controls reading of the plurality of pixels, the method including:

generating a plurality of control signals for controlling of at least one of the scanning control section or the readout control section, and a plurality of reference signals; and
detecting a failure of a first waveform generation part or a second waveform generation part on a basis of comparison between the plurality of control signals and the plurality of reference signals.

According to the imaging device, the first and second imaging systems, and the failure detection method of respective embodiments of the present disclosure, a failure of the first waveform generation part or the second waveform generation part is detected on the basis of comparison between the plurality of control signals and the plurality of reference signals, thus making it possible to perform the failure detection of the first waveform generation part or the second waveform generation part. It is to be noted that the effects of the present disclosure are not necessarily limited to the effects described here, and may be any of the effects described herein.

This application claims the benefit of Japanese Priority Patent Application JP2019-006177 filed with the Japan Patent Office on Jan. 17, 2019, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An imaging device comprising:
a pixel array including a plurality of pixels;
a scanning control section that controls scanning of the plurality of pixels;
a readout control section that controls reading of the plurality of pixels;
a first waveform generation part that generates a plurality of control signals for controlling of at least one of the scanning control section or the readout control section;
a second waveform generation part that generates a plurality of reference signals; and
a failure detection section that detects a failure of the first waveform generation part or the second waveform generation part on a basis of comparison between the plurality of control signals and the plurality of reference signals, wherein
the first waveform generation part includes a first register section that outputs a plurality of set values, and a first timing generation section that outputs the plurality of control signals on a basis of the plurality of set values, and
the second waveform generation part includes a second timing generation section that outputs the plurality of reference signals on a basis of the plurality of set values.

2. The imaging device according to claim 1, wherein
the first timing generation section outputs the plurality of control signals in parallel,
the second timing generation section outputs the plurality of reference signals serially or in parallel, and
the failure detection section compares the control signal and the reference signal with each other, for the control signal and the reference signal of which the set values are in common.

3. The imaging device according to claim 2, wherein the failure detection section sequentially compares the control signal and the reference signal with each other at each of a predetermined cycle.

4. An imaging device, comprising:
a pixel array including a plurality of pixels;
a scanning control section that controls scanning of the plurality of pixels;
a readout control section that controls reading of the plurality of pixels;
a first waveform generation part that generates a plurality of control signals for controlling of at least one of the scanning control section or the readout control section;
a second waveform generation part that generates a plurality of reference signals; and
a failure detection section that detects a failure of the first waveform generation part or the second waveform generation part on a basis of comparison between the plurality of control signals and the plurality of reference signals, wherein
the first waveform generation part includes a first register section that outputs a first set value, and a first timing generation section that outputs the control signal on a basis of the first set value,
the second waveform generation part includes a second register section that outputs a second set value on a basis of same control as the first register section, and a second timing generation section that outputs the reference signal on a basis of the second set value,
the first timing generation section outputs the plurality of control signals in parallel,
the second timing generation section outputs the plurality of reference signals serially or in parallel,
the failure detection section compares the control signal and the reference signal with each other, for the control signal and the reference signal of which the set values are in common, and
the failure detection section sequentially compares the control signal and the reference signal with each other at each of a predetermined cycle.

5. An imaging system comprising:
an imaging unit that performs imaging of a subject to generate an imaging signal;
an arithmetic unit that converts the imaging signal generated by the imaging unit to an image signal; and
a display unit that displays an image corresponding to the image signal generated by the arithmetic unit,
the imaging unit including
a pixel array including a plurality of pixels,
a scanning control section that controls scanning of the plurality of pixels,
a readout control section that controls reading of the plurality of pixels,
a first waveform generation part that generates a plurality of control signals for controlling of at least one of the scanning control section or the readout control section,
a second waveform generation part that generates a plurality of reference signals, and
a failure detection section that detects a failure of the first waveform generation part or the second waveform generation part on a basis of comparison between the plurality of control signals and the plurality of reference signals, wherein
the first waveform generation part includes a first register section that outputs a plurality of set values, and a first timing generation section that outputs the plurality of control signals on a basis of the plurality of set values, and
the second waveform generation part includes a second timing generation section that outputs the plurality of reference signals on a basis of the plurality of set values.

6. The imaging system according to claim 5, wherein
the first timing generation section outputs the plurality of control signals in parallel,
the second timing generation section outputs the plurality of reference signals serially or in parallel, and
the failure detection section compares the control signal and the reference signal with each other, for the control signal and the reference signal of which the set values are in common.

7. The imaging system according to claim 6, wherein the failure detection section sequentially compares the control signal and the reference signal with each other at each of a predetermined cycle.

8. An comprising:
an imaging unit that performs imaging of a subject to generate an imaging signal;
an arithmetic unit that converts the imaging signal generated by the imaging unit to an image signal; and
a display unit that displays an image corresponding to the image signal generated by the arithmetic unit,
the imaging unit including
a pixel array including a plurality of pixels,
a scanning control section that controls scanning of the plurality of pixels,
a readout control section that controls reading of the plurality of pixels,
a first waveform generation part that generates a plurality of control signals for controlling of at least one of the scanning control section or the readout control section,
a second waveform generation part that generates a plurality of reference signals, and
a failure detection section that detects a failure of the first waveform generation part or the second waveform generation part on a basis of comparison between the plurality of control signals and the plurality of reference signals, wherein
the first waveform generation part includes a first register section that outputs a first set value, and a first timing generation section that outputs the control signal on a basis of the first set value, and
the second waveform generation part includes a second register section that outputs a second set value on a basis of same control as the first register section, and a second timing generation section that outputs the reference signal on a basis of the second set value.

9. The imaging system according to claim 8, wherein
the first timing generation section outputs the plurality of control signals in parallel,
the second timing generation section outputs the plurality of reference signals serially or in parallel, and
the failure detection section compares the control signal and the reference signal with each other, for the control signal and the reference signal of which the set values are in common.

10. The imaging system according to claim 9, wherein the failure detection section sequentially compares the control signal and the reference signal with each other at each of a predetermined cycle.

11. An imaging system, comprising:
an imaging unit that performs imaging of a subject to generate an imaging signal;

a failure detection unit that detects a failure of the imaging unit;

an arithmetic unit that converts the imaging signal generated by the imaging unit to an image signal; and a display unit that displays an image corresponding to the image signal generated by the arithmetic unit, the imaging unit including
- a pixel array including a plurality of pixels,
- a scanning control section that controls scanning of the plurality of pixels,
- a readout control section that controls reading of the plurality of pixels,
- a first waveform generation part that generates a plurality of control signals for controlling of at least one of the scanning control section or the readout control section, and
- a second waveform generation part that generates a plurality of reference signals, the failure detection unit detecting a failure of the first waveform generation part or the second waveform generation part on a basis of comparison between the plurality of control signals and the plurality of reference signals, wherein the first waveform generation part includes a first register section that outputs a plurality of set values, and a first timing generation section that outputs the plurality of control signals on a basis of the plurality of set values, and the second waveform generation part includes a second timing generation section that outputs the plurality of reference signals on a basis of the plurality of set values.

12. The imaging system according to claim 11, wherein
the first timing generation section outputs the plurality of control signals in parallel,
the second timing generation section outputs the plurality of reference signals serially or in parallel, and
the failure detection section compares the control signal and the reference signal with each other, for the control signal and the reference signal of which the set values are in common.

13. The imaging system according to claim 12, wherein the failure detection section sequentially compares the control signal and the reference signal with each other at each of a predetermined cycle.

* * * * *